United States Patent

Ogawa

(10) Patent No.: US 8,287,378 B2
(45) Date of Patent: Oct. 16, 2012

(54) NETWORK GAME SYSTEM AND NETWORK GAME PROCESSING METHOD

(75) Inventor: Yojiro Ogawa, Tokyo (JP)

(73) Assignee: Sega Corporation, Tokyo (JP)

(*) Notice: Subject to any disclaimer, the term of this patent is extended or adjusted under 35 U.S.C. 154(b) by 1951 days.

(21) Appl. No.: 10/889,854

(22) Filed: Jul. 13, 2004

(65) Prior Publication Data

US 2005/0021159 A1    Jan. 27, 2005

(30) Foreign Application Priority Data

Jul. 18, 2003    (JP) .................................. 2003-199223

(51) Int. Cl.
   *A63F 9/24* (2006.01)
   *A63F 13/00* (2006.01)

(52) U.S. Cl. ................. 463/42; 463/40; 463/41; 700/90; 700/91; 700/92; 700/93

(58) Field of Classification Search .............. 463/40–42; 700/90–93
   See application file for complete search history.

(56) References Cited

U.S. PATENT DOCUMENTS

| | | | | |
|---|---|---|---|---|
| 6,115,393 | A * | 9/2000 | Engel et al. | 370/469 |
| 6,273,818 | B1 * | 8/2001 | Komoto | 463/31 |
| 6,409,604 | B1 * | 6/2002 | Matsuno | 463/43 |
| 6,424,353 | B2 * | 7/2002 | Yamamoto et al. | 345/619 |
| 6,729,954 | B2 * | 5/2004 | Atsumi et al. | 463/7 |
| 6,736,724 | B1 * | 5/2004 | Erikawa et al. | 463/7 |
| 6,755,743 | B1 * | 6/2004 | Yamashita et al. | 463/42 |
| 6,884,169 | B2 * | 4/2005 | Tsuchida et al. | 463/31 |
| 7,001,272 | B2 * | 2/2006 | Yamashita et al. | 463/7 |
| 2001/0016511 | A1 * | 8/2001 | Hino et al. | 463/8 |
| 2001/0029201 | A1 * | 10/2001 | Minami | 463/31 |
| 2002/0016195 | A1 * | 2/2002 | Namba et al. | 463/3 |
| 2002/0095523 | A1 * | 7/2002 | Shimakawa et al. | 709/316 |
| 2002/0098890 | A1 * | 7/2002 | Sakaguchi | 463/42 |
| 2003/0093168 | A1 * | 5/2003 | Nagaoka | 700/91 |
| 2003/0114226 | A1 * | 6/2003 | Kimura | 463/42 |
| 2003/0216184 | A1 * | 11/2003 | Kigoshi | 463/42 |
| 2004/0143852 | A1 * | 7/2004 | Meyers | 725/133 |
| 2004/0198497 | A1 | 10/2004 | Yamashita et al. | |
| 2004/0198498 | A1 | 10/2004 | Yamashita et al. | |

FOREIGN PATENT DOCUMENTS

KR    2001-15341    2/2001

OTHER PUBLICATIONS

Sep. 1, 1998 Lineage (video game) Wikipedia, the free encyclopedia.

* cited by examiner

*Primary Examiner* — Dmitry Suhol
*Assistant Examiner* — Ryan Hsu
(74) *Attorney, Agent, or Firm* — Jordan and Hamburg LLP

(57) ABSTRACT

When the game machines (2100, 2110 and 2120) join the same network game, display images necessary for the users playing in a common virtual space are displayed in the displays (2105, 2115 and 2125) of the game machines. The game machines are connected with the controllers (2109, 2119 and 2129). The users operate various operations by means of the controllers for executing the game. The user can play match against or cooperate with the users participating in a common network game, and can also communicate with the users.

8 Claims, 24 Drawing Sheets

Fig. 4-1

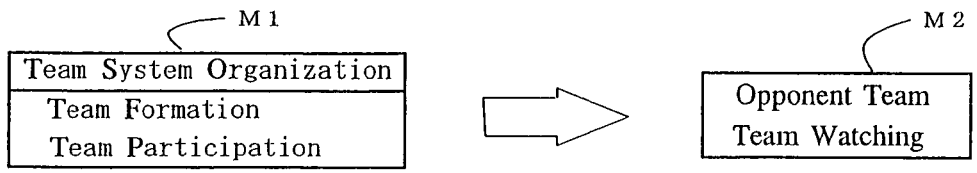

| Team System Organization |
|---|
| Team Formation |
| Team Participation |

⇒

| M 2 |
|---|
| Opponent Team |
| Team Watching |

```
Room Name    :
Password     :
Team Watching :
          Registration
```

| ◎ | 1 0 : 0 5 ~ | 8 players-individual-A rule-battle | 3/8 |
|---|---|---|---|
| ◎ | 1 0 : 1 0 ~ | 15 players-group-C rule battle | 9/16 |
| ◎ | 1 0 : 1 0 ~ | 4 players-individual-B rule-battle | 1/4 |

| ◎ | 1 0 : 0 5 ~ | 8 players-individual-A rule-battle | 3/8 |
|---|---|---|---|
| ◎ | 1 0 : 1 0 ~ | 15 players-group-C rule-battle | 9/16 |
| ◎ | 1 0 : 1 0 ~ | 4 players-in... | |

| Box A | F U J I W A R A |
|---|---|
| Box B | T O Y O |
| Box C | C O M |
| Box D | I S H I G U R O |

```
Room Name    :
Password     :
Battle Watching : 1 0 : 0 5 ~   8 players-individual-A rule-battle  3/8
                          Registration
```

```
Group Name  :

Password  :

Organization
```

Fig. 5-2

| Group Name : |
| Password : |
| Participation |

Level Height of Opponent (Difence from the User )

Level Height of Opponent (Difence from the User )

NETWORK GAME SYSTEM AND NETWORK GAME PROCESSING METHOD

BACKGROUND OF THE INVENTION

1. Field of the Invention

The present invention relates to a game system including a plurality of game machines and a network, on which a network game is available for the game machines through the network.

2. Prior Art

In recent years, game systems are spread on which a plurality of game machines are connected to a network through a communication medium such as telephone line for executing network games.

In the network game, when a user (player) requests, to join the game, procedures are necessary of communicating with other users in order to obtain approval of other users, and procedures are necessary in starting the game on a game server after the users' approval. Such procedures prevent smooth proceeding of the game and entry motivation to the game.

There are network games with a lot of players who are classified into groups fighting against one another. During such network games, it is possible that information for cooperative players leaks to opponent players, because the information is transmitted by means of "chat" or other communication means accessible to all opponent players, also.

However, if the "chat" information is communicated only within cooperative players, they may be unconscious of opponent players, and quality of the game is limited.

As for offline games not connected to the network, a distribution of number of items of each kind used or obtained by the players, during the game is executed, will be within the range estimated by a game developer. However, it is the problem of online games that a partial game balance occurs beyond the estimation of the game developer, due to deviated number of items, because many and unspecified players join games.

SUMMARY OF THE INVENTION

The present invention is invented to solve the above conventional problems and has an object to improve game entry proceedings and entry motivation of players to games.

Another object of the present invention is to enable players to transmit chat information advantageous to cooperative players playing the same game in order to introduce the cooperative players to advantageous status, and is to enable the players to be conscious of enemies (opponents).

Further, another object of the present invention is to keep a good balance of number of items, even if the distribution of the number of items deviated In accordance with the present invention, a network game system, includes a network, a plurality of game processing terminals connected to said network and a server which receives information transmitted through said network from said game processing terminals and transmits necessary information to said game processing terminals, wherein said server performs a series of processing that said server transmits information necessary for reservation of participating in said game took place at a predetermined time, that said server determines which of said game processing terminals participate in said game according to information of participating in said game, received from said game processing terminals, that said server transmits information concerning an opening of said game to said game processing terminals participating in said game, and that said server deletes information necessary for reservation of participating, and said server repeats said series of processing, and said game processing terminals participating in said game transmit information for participating in said game, in response to said information necessary for reservation of participating in said game, and prepare an environment according to said information of participating in said game.

Thereby, game entry proceedings and entry motivation of players to games are improved.

In accordance with the present invention, a network game system, includes a network, a plurality of game processing terminals connected to said network and a server which receives information transmitted through said network from said game processing terminals and transmits necessary information to said game processing terminals, said game processing terminals being permitted by said server to participate in a game when said game processing terminals process a predetermined procedure, wherein said predetermined procedure is executed in a virtual space of said network game system, each said game processing terminal searches characters controlled by other said game processing terminals in an area in said virtual space where a character controlled by each said game processing terminal moves, each said game processing terminal transmits information to said server necessary for participating in said game to be played only with said other game processing terminals controlling said characters in said area, said server processes grouping of said game terminals of said characters in said area so that said game processing terminals play said game in said virtual space when said server receives said information necessary for participating in said game.

Thereby, game entry proceedings and entry motivation of players to games are improved.

In accordance with the present invention, each said game processing terminal outputs information for asking a player of said other game processing terminals of said characters in said area whether said other game processing terminals participate in said game or not, and transmits information for participating in said game when each said game processing terminal receives input for participation from said other game processing terminals.

Thereby, the game entry proceeding becomes simple.

In accordance with the present invention, game processing terminals for executing a game together and for communicating by "chat" during said game with one another, said game processing terminals being connected to a network, wherein each said game processing terminal, includes a selecting means for selecting by an input operation other of said game processing terminals in a virtual space where each said game processing terminal exists, and a transmitting means for transmitting chat information input by each said game processing terminal to said selected game processing terminals and other information than said chat information to said game processing terminals not selected.

Thereby, each user has communication advantageous for his own game processing.

In accordance with the present invention, game processing terminals for executing a game together and for communicating by "chat" during the game with one another, the game processing terminals being connected to a network, wherein each the game processing terminal, includes: a distinguishing means for distinguishing other the game processing terminals between cooperative terminals and opponent terminals, a transmitting means for transmitting chat information input by each the game processing terminal to the cooperative terminals and other information than the chat information to the opponent terminals.

Thereby, each user has communication advantageous for his own game processing.

In accordance with the present invention, a network game system, includes a network, a plurality of game processing terminals connected to the network and a server which receives information transmitted through the network from the game processing terminals and transmits necessary information to the game processing terminals, wherein each the game processing terminal executes a game using a first item data stored in a memory medium of the game processing terminal, when each the game processing terminal executes independently the game without communicating with other the game processing terminals, each the game processing terminal substitutes the first item data by a second item data downloaded from the server, and executes a game using the second item data, when each the game processing terminal executes the game together with other the game processing terminals through the network.

Thereby, the value of item data held by players participating in a game.

In accordance with the present invention, a network game processing method for controlling a game executed on a plurality of game processing terminals connected to a network, repeating every predetermined time steps of transmitting to the game processing terminals information necessary for reservation of participating in the game took place at a predetermined time, receiving information of participating in the game from the game processing terminals, determining which of the game processing terminals participate in the game according to information of participating in the game, received from the game processing terminals, transmitting information concerning an opening of the game to the game processing terminals participating in the game, and deleting information necessary for reservation of participating.

Thereby, game entry proceedings and entry motivation of players to games are improved.

In accordance with the present invention, a network game processing method for grouping a plurality of game processing terminals connected to a network so that the game processing terminals participate in a game in a common virtual space when the game processing terminals execute a predetermined procedure includes steps of receiving information from the game processing terminals that the game processing terminals moves into an area in the virtual space, judging whether the information is received from two or more of the game processing terminals or not, and grouping the two or more game processing terminals when the information is received so that the game processing terminals communicates with one another information for the game.

Thereby, the game entry proceeding becomes simple.

In accordance with the present invention, a network game processing method for a plurality of game processing terminals connected through a network with a server so that the game processing terminals participate a game in a common virtual space includes steps of searching characters controlled by other the game processing terminals in an area in the virtual space where a character controlled by each the game processing terminal moves into, transmitting information to the server necessary for participating in the game to be played only with the other game processing terminals controlling the characters in the area, and changing display image of each the game processing terminal into an image of the game which is executed in the common virtual space with the other game processing terminal.

Thereby, the game entry proceeding becomes further simple.

In accordance with the present invention, a network game processing method further includes steps of outputting information asking whether a player of the characters in the area participate the game or not, receiving input operated input of the other game processing terminal, and transmitting information to the server for participating in the game when the operated input is received.

Thereby, each user has communication advantageous for his own game processing.

In accordance with the present invention, a network game processing method for a plurality of game processing terminals connected with a network includes steps of selecting by an input operation other of the game processing terminals in a virtual space where each the game processing terminal exists, transmitting chat information input by each the game processing terminal to the selected game processing terminals, and transmitting other information than the chat information to the game processing terminals not selected.

Thereby, each user has communication advantageous for his own game processing.

In accordance with the present invention, a network game processing method for a plurality of game processing terminals connected with a network includes steps of distinguishing other the game processing terminals between cooperative terminals and opponent terminals, and transmitting chat information input by each the game processing terminal to the cooperative terminals and other information than the chat information to the opponent terminals.

Thereby, each user has communication advantageous for his own game processing.

In accordance with the present invention, a network game processing method for a plurality of game processing terminals connected through a network to a server includes steps of executing a game using a first item data stored in a memory medium of the game processing terminal, when each the game processing terminal executes independently the game without communicating with other the game processing terminals, downloading a second item data from the server when each the game processing terminal executes the game together with other the game processing terminals through the network, and executing the game with substituting the first item data by the second item data.

BRIEF DESCRIPTION OF DRAWINGS

FIG. 4-1 is a menu for selecting a processing of the "game watching" in FIG. 3, FIG. 4-2 is a menu for selecting a battle to be watched in the "game watching" in FIG. 3, FIG. 4-3 shows a list of battles to be watched shown in the processing of the "game watching", FIG. 4-4 shows a list of the battles to be watched and detailed data of each battle, FIG. 4-5 shows a menu for registering a battle to be watched in the processing of the "game watching" in FIG. 3, FIG. 5 is a flowchart showing a "grouping processing" in FIG. 3, FIG. 5-1 shows a display image for making a group in the "grouping processing" in FIG. 5, FIG. 5-2 is a display image for participating a group in the "grouping processing" in FIG. 5, FIG. 6-1 shows a menu for selecting "tournament entry" in a battle, "tournament confirmation" or "tournament cancel" in the "entry processing" in FIG. 6, FIG. 6-2 shows a menu for selecting a battle in the "tournament entry" in a battle in FIG. 6, FIG. 6-3 shows details of a tournament in the "entry processing" in FIG. 6, FIG. 6-4 shows a processing of box selection of individual battles in the "entry processing" in FIG. 6, FIG. 6-5 shows a processing of box selection of group battle in the "entry processing" in FIG. 6, FIG. 6-6 shows registering processing in the "entry processing" in FIG. 6, FIG. 6-7 is a graph showing multiplier by which the point of the point index is multiplied in the "entry processing" in FIG. 6, FIG. 7 is a display image showing "deck-edit" of an item card in the "entry processing" in FIG. 6.

DETAILED DESCRIPTION OF THE INVENTION

Preferred embodiments of the present invention is described, hereafter.

First Embodiment

Next, a first embodiment of a game system according to the present invention is described with reference to the attached drawings.

Figure 1:
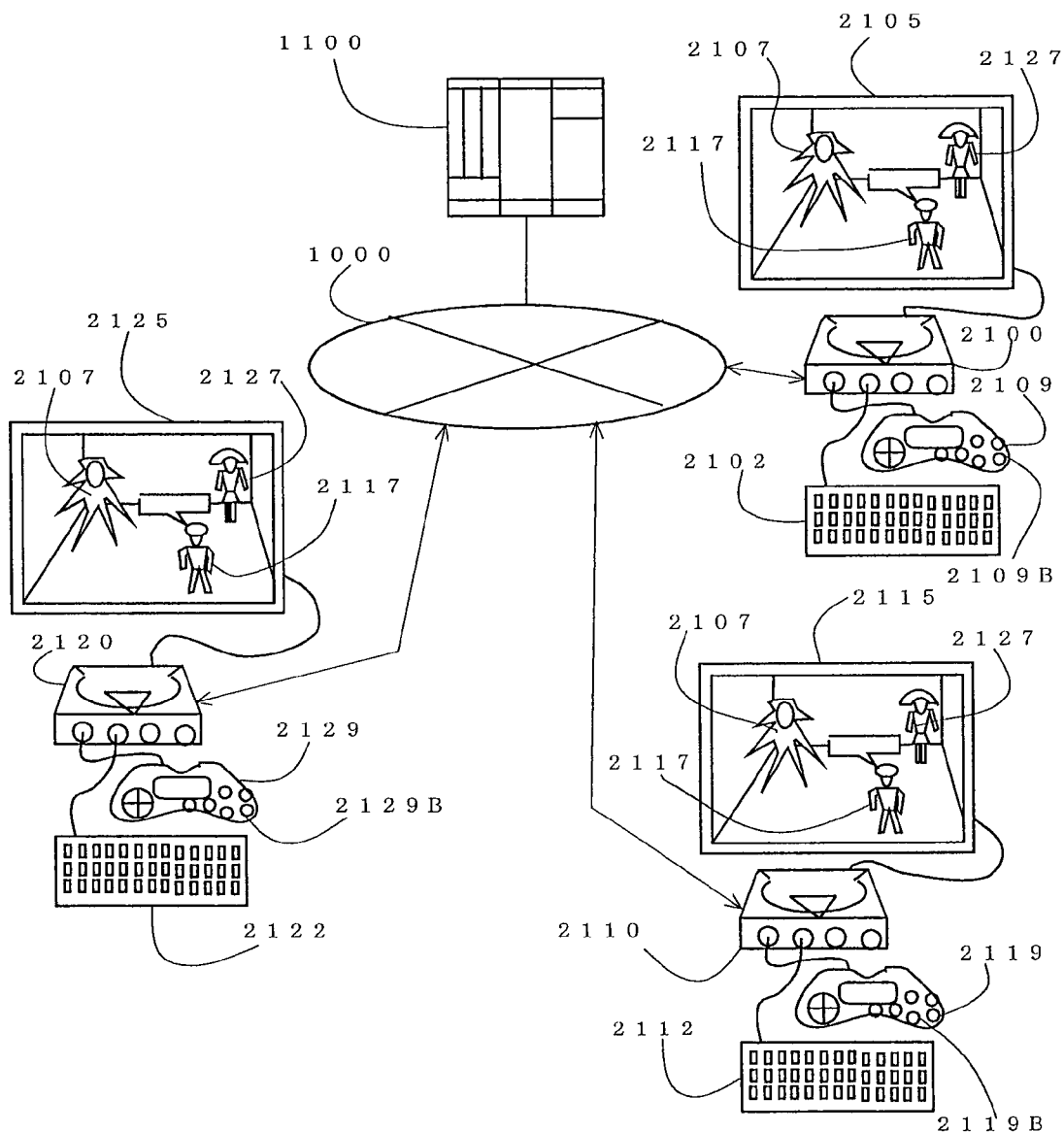
FIG. 1 is a block diagram showing totally the first embodiment according to the present invention.
Figure 2:
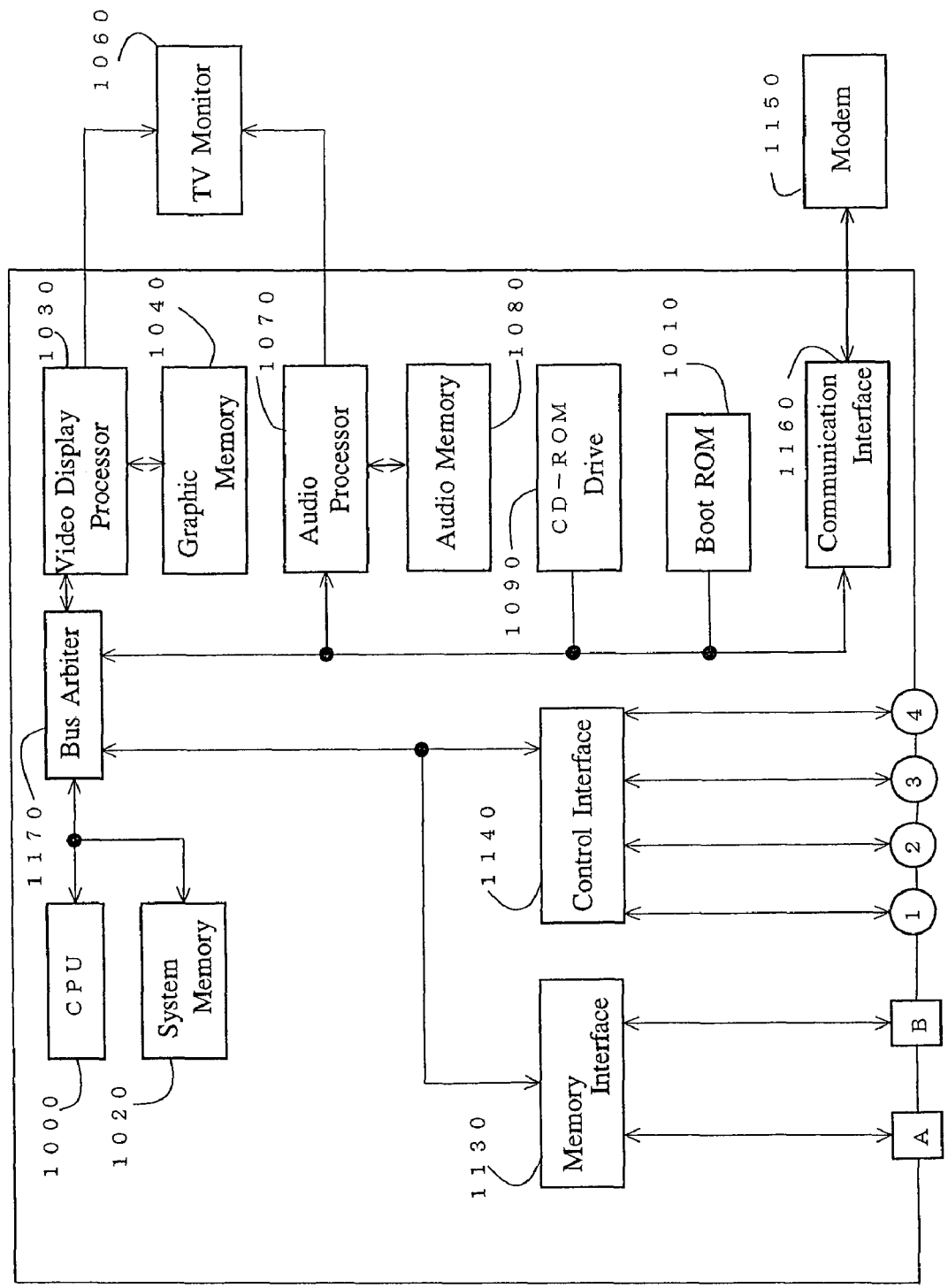
FIG. 2 is a block diagram showing the game machine in FIG. 1.

FIG. 1 is a block diagram showing totally the first embodiment according to the present invention, and FIG. 2 is a block diagram showing the game machine in FIG. 1.

Figure 3:
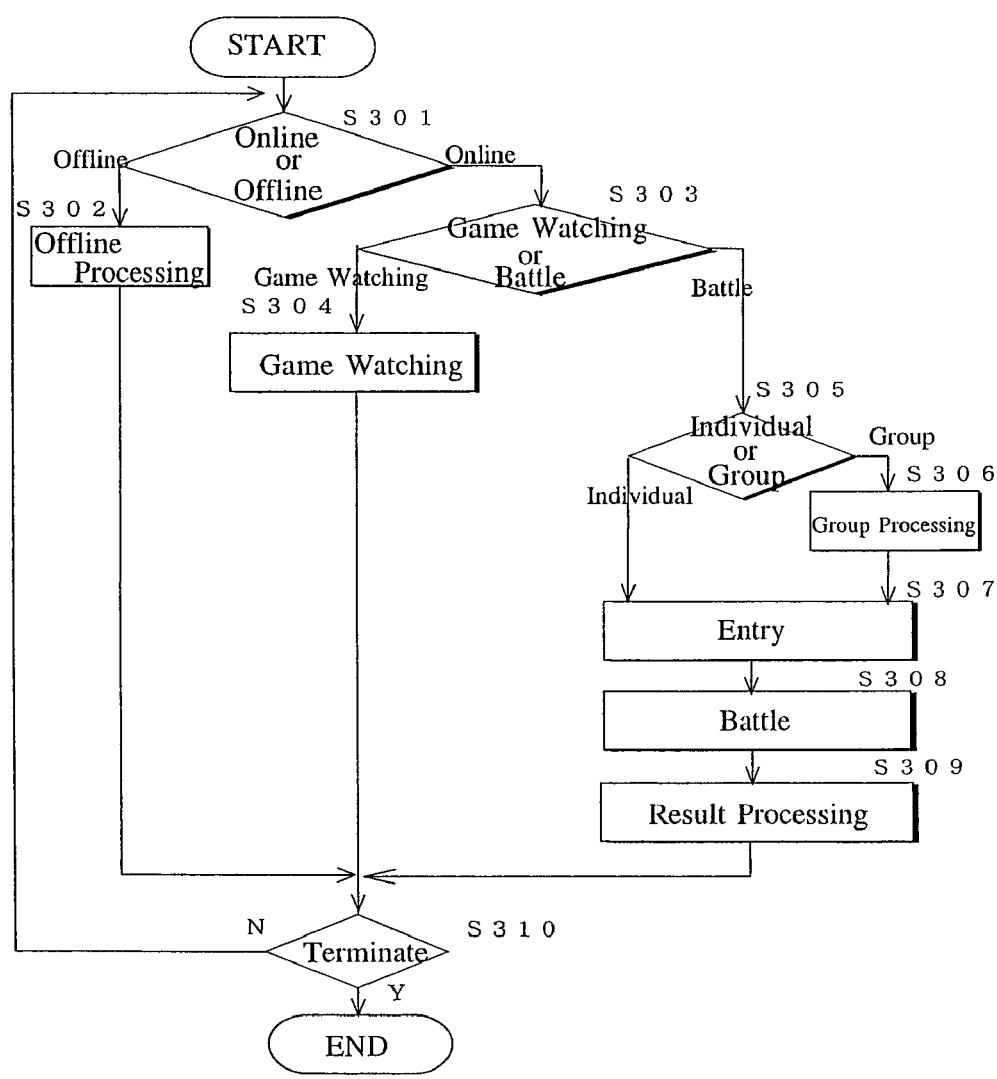
FIG. 3 is a flowchart showing a total processing of the game system in FIG. 1.
Figure 4:
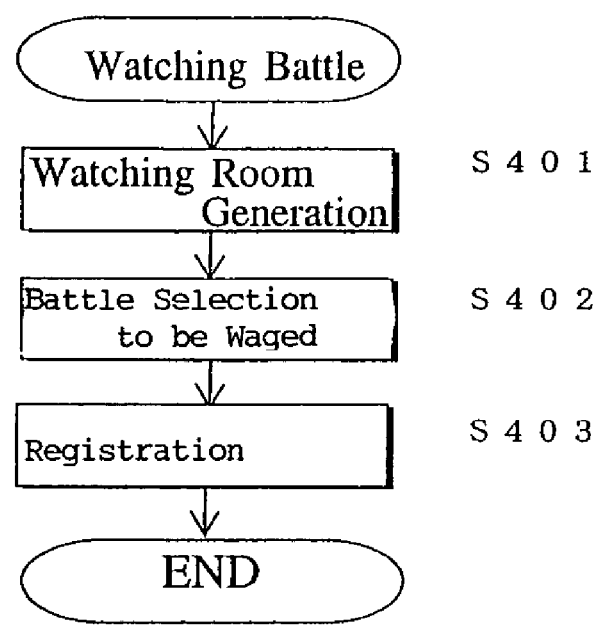
FIG. 4 is a flowchart showing a processing of "game watching" in FIG. 3.
Figure 5:
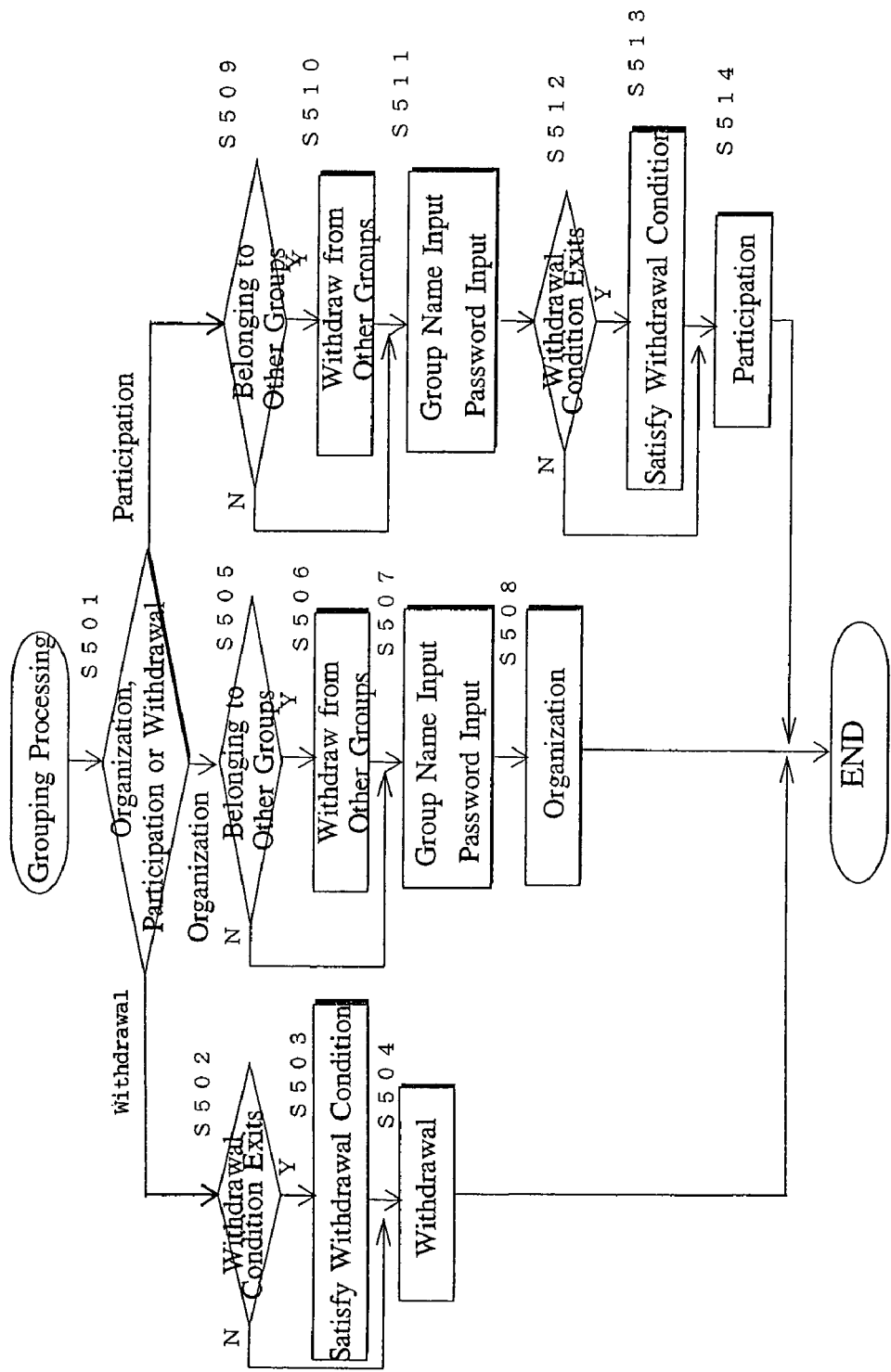
Figure 6:
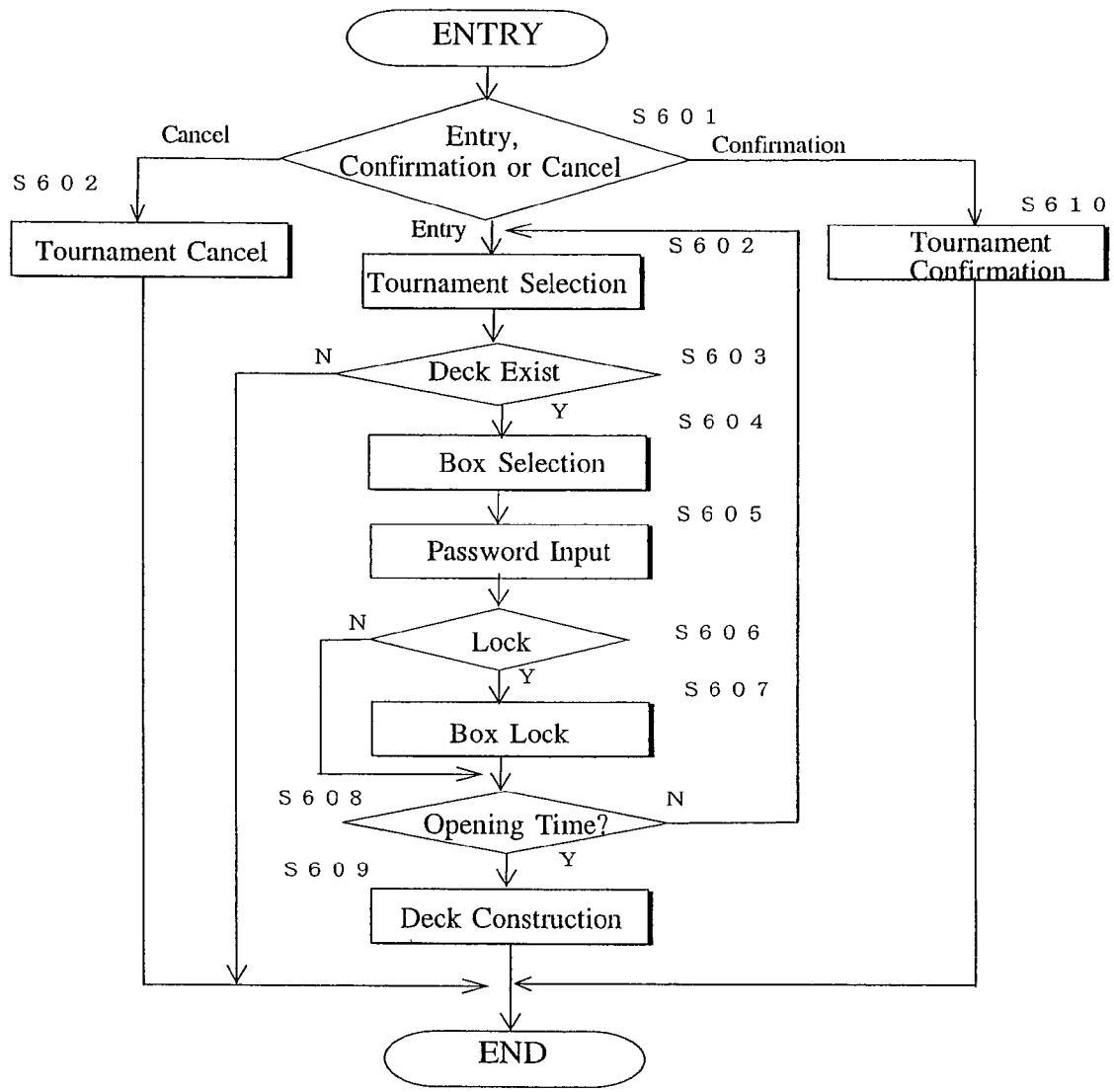
FIG. 6 is a flowchart showing an "entry processing" in FIG. 3.
Figures 1, 6:
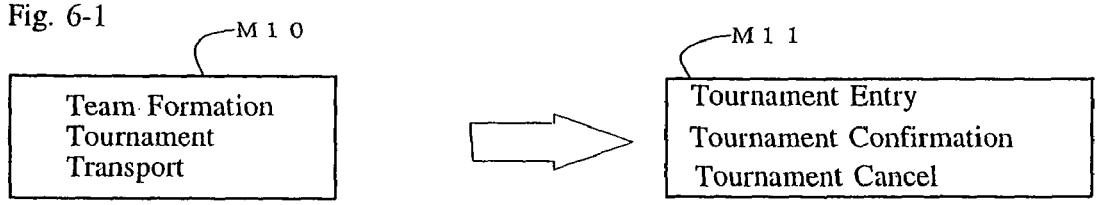
Figures 2, 6:
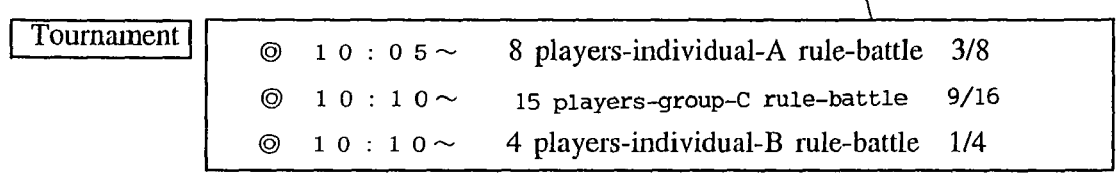
Figures 4, 6:
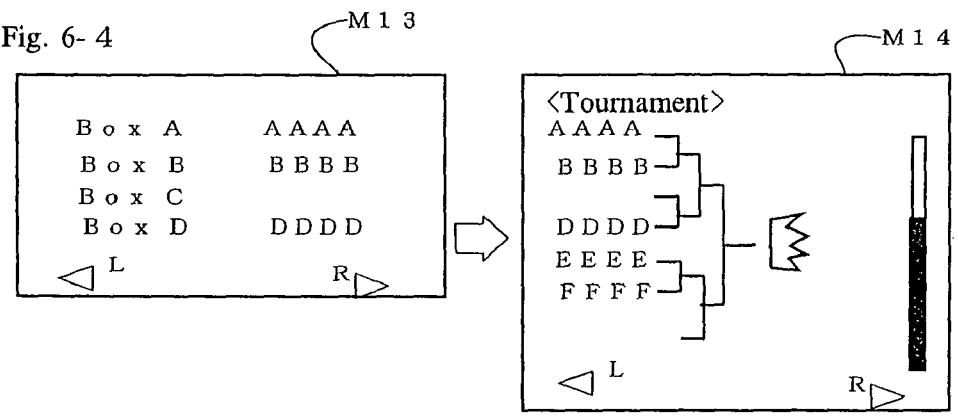
Figures 5, 6:
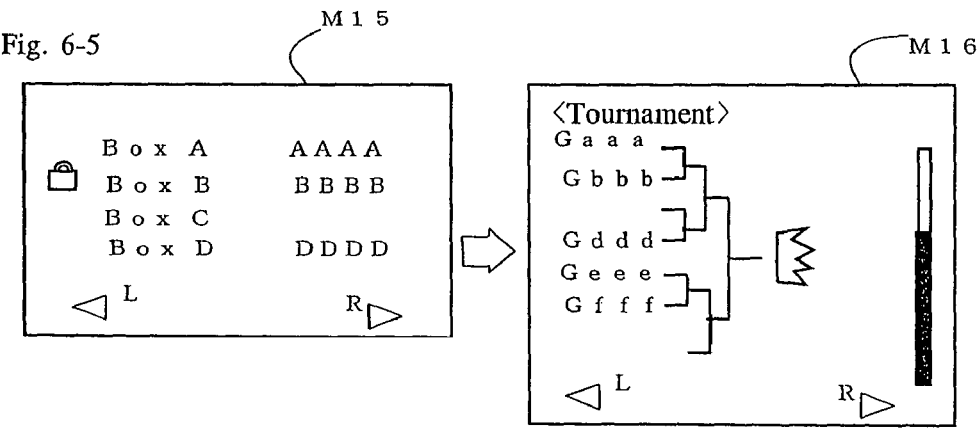
Figures 3, 6:
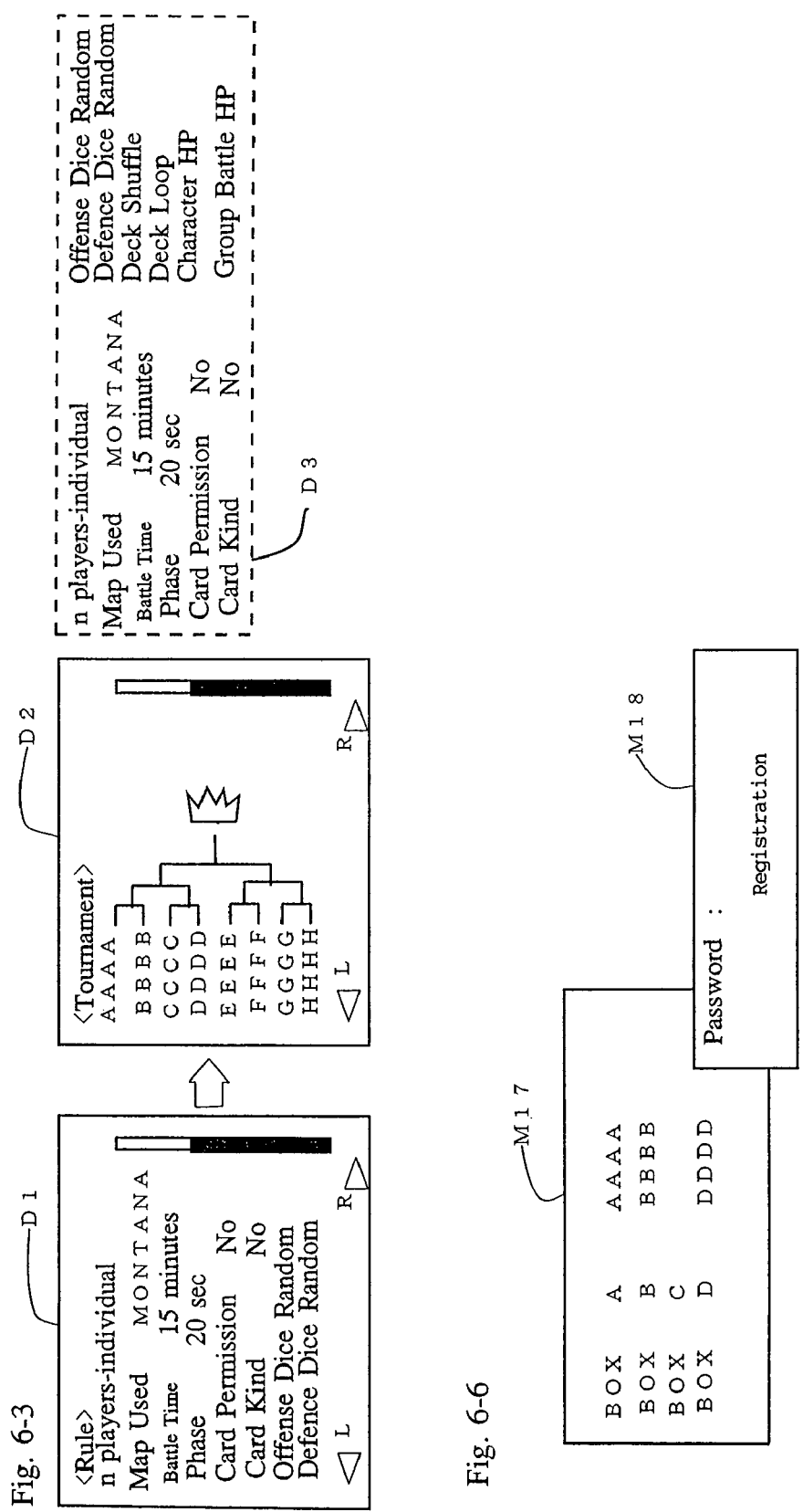
Figures 6, 7:
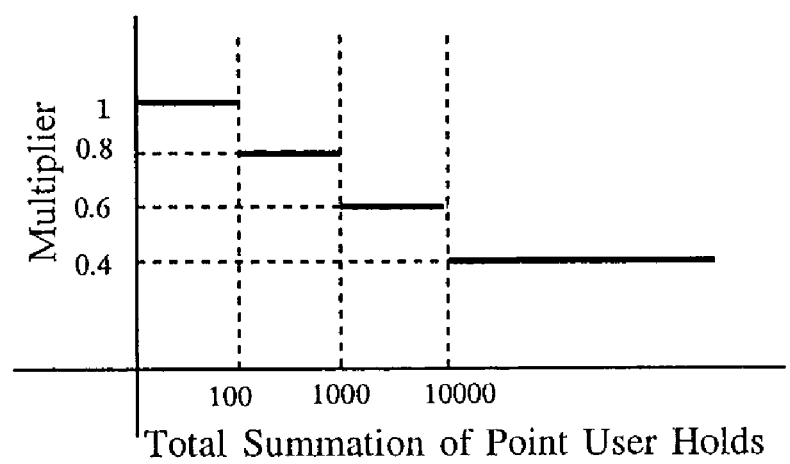
Figure 7:
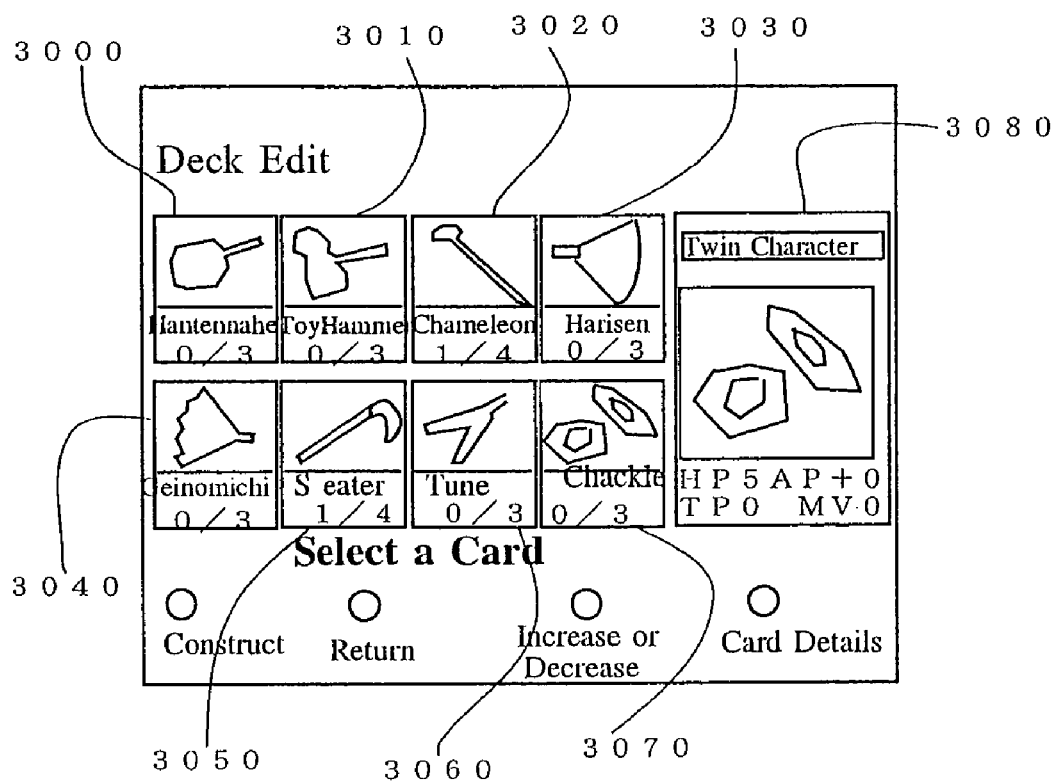
Figure 8:
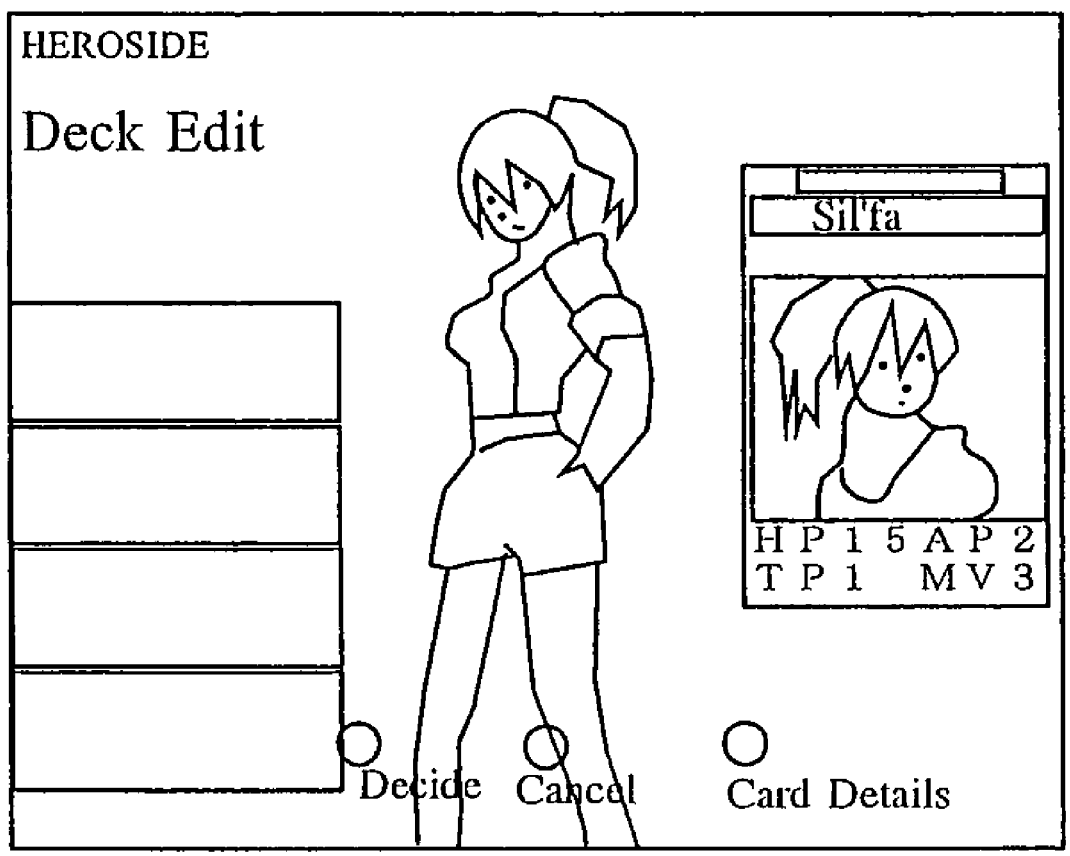
FIG. 8 is a display image showing the "deck-edit" of a hunter's card in the "entry processing" in FIG. 6.
Figure 9:
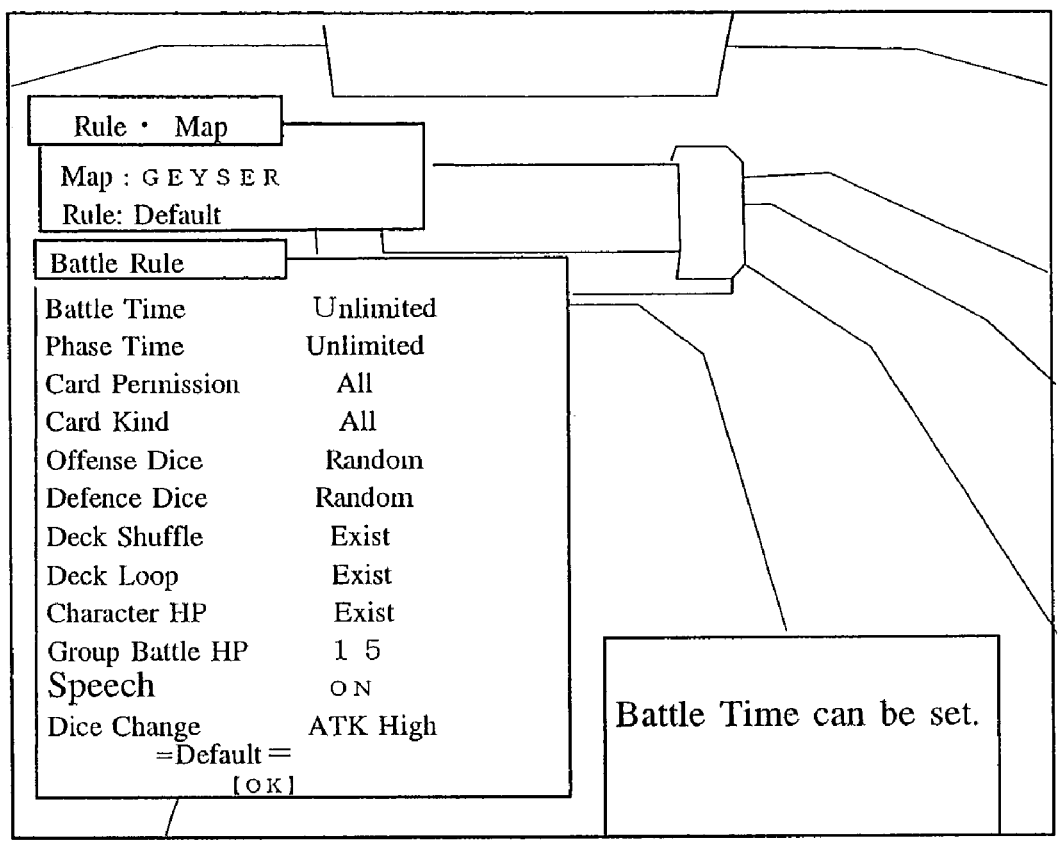
FIG. 9 is a display image showing a rule of the "deck-edit" in the "entry processing" in FIG. 6.
Figure 10:
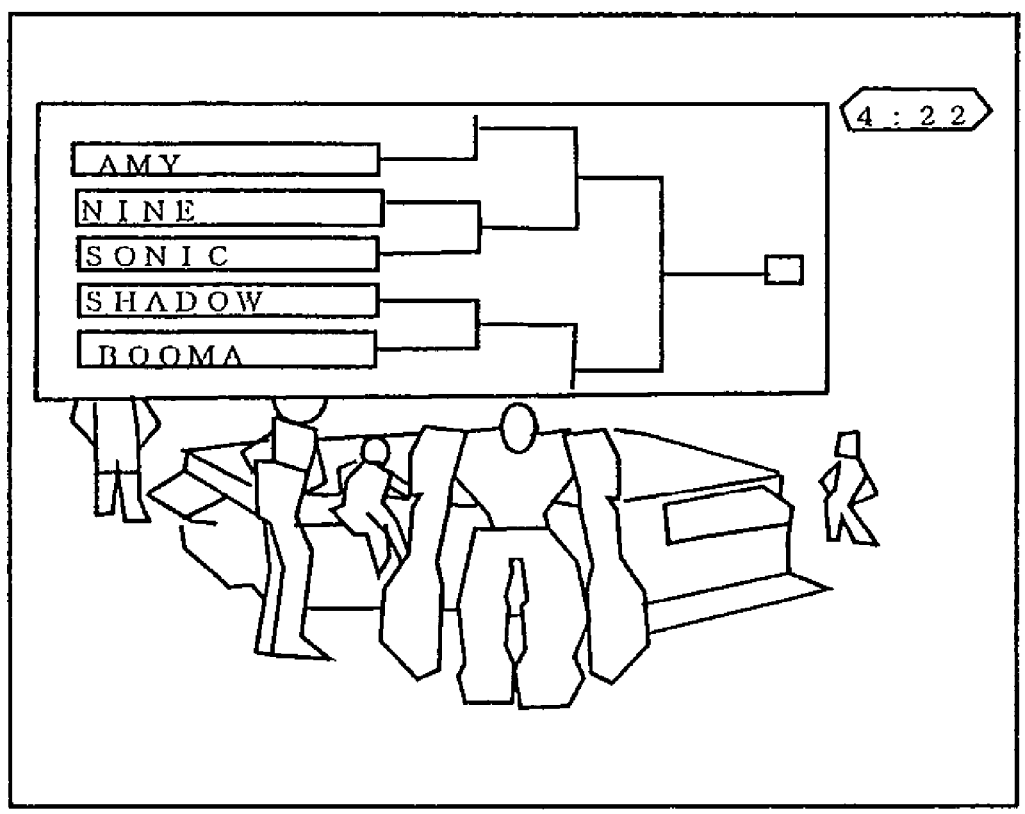
FIG. 10 is a display image showing a tournament table of FIG. 6-3.
Figure 11:
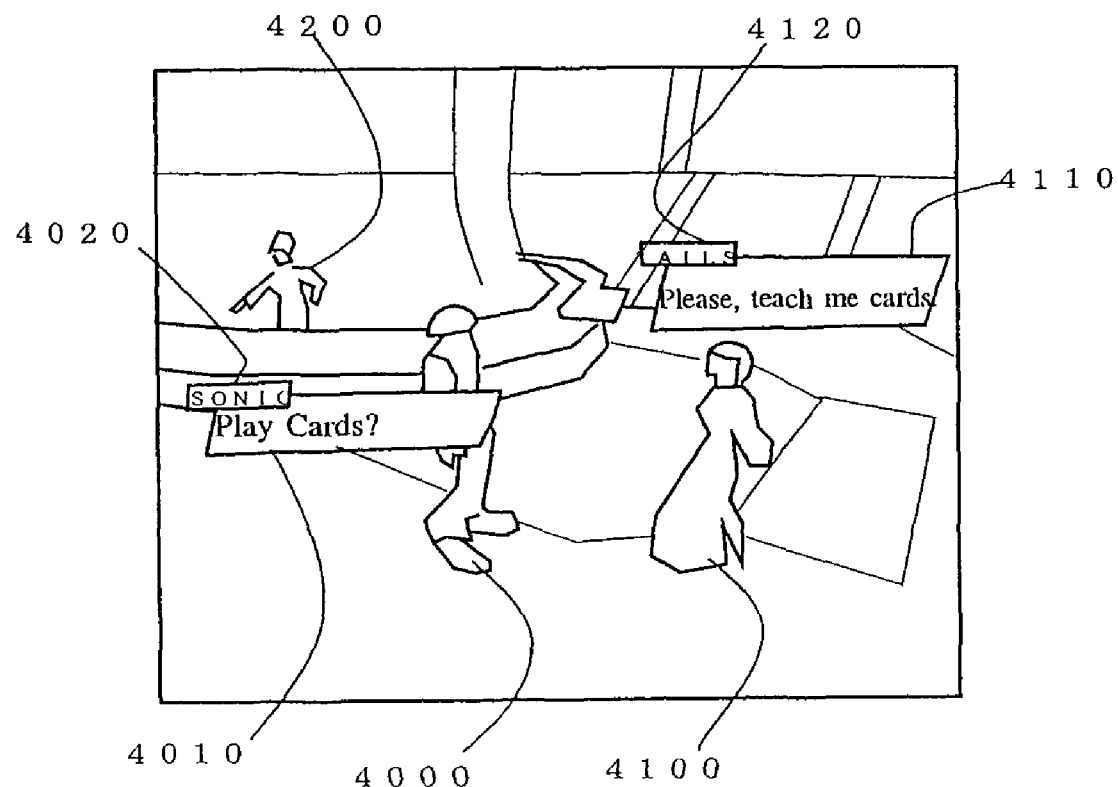
FIG. 11 is a display image showing a communication between users when a online processing is selected in the processing in FIG. 3.
Figure 12:
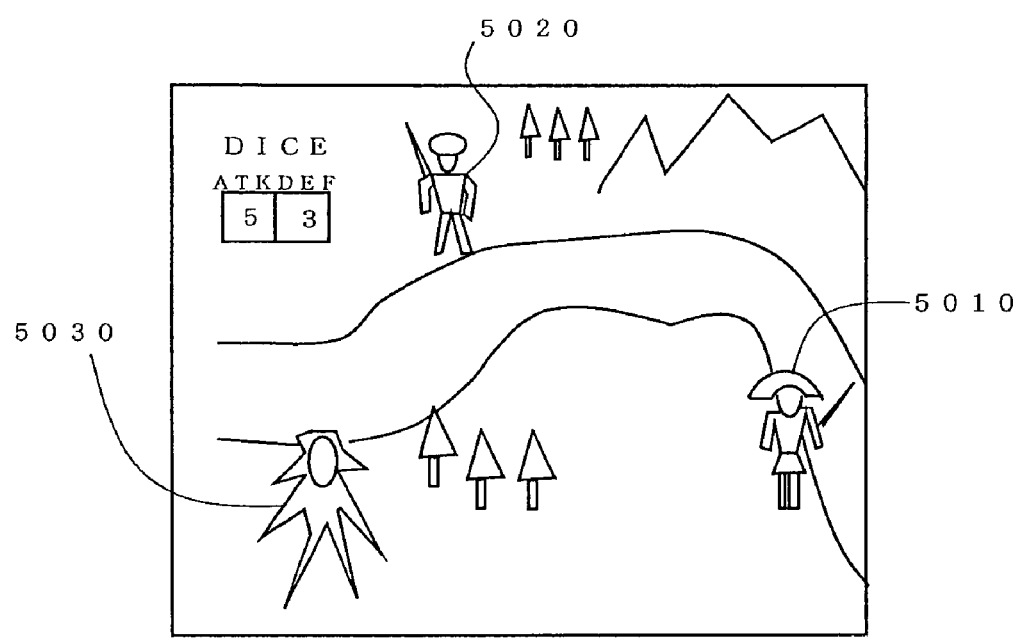
FIG. 12 is a display image showing "dice" of "battle" in FIG. 3.
Figure 13:
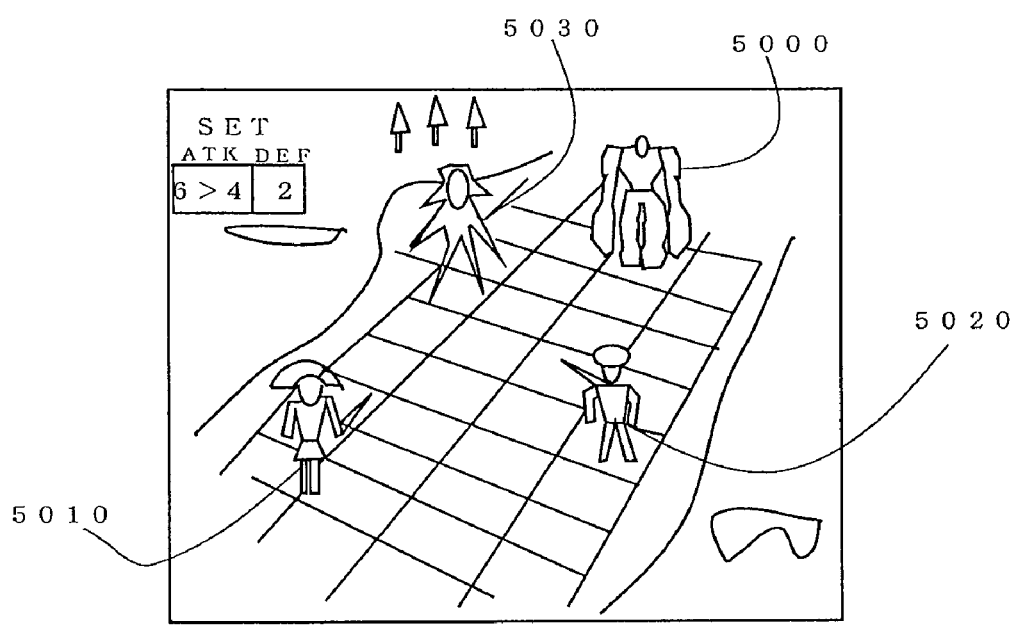
FIG. 13 is a display image showing "set" of "battle" in FIG. 3.
Figure 14:
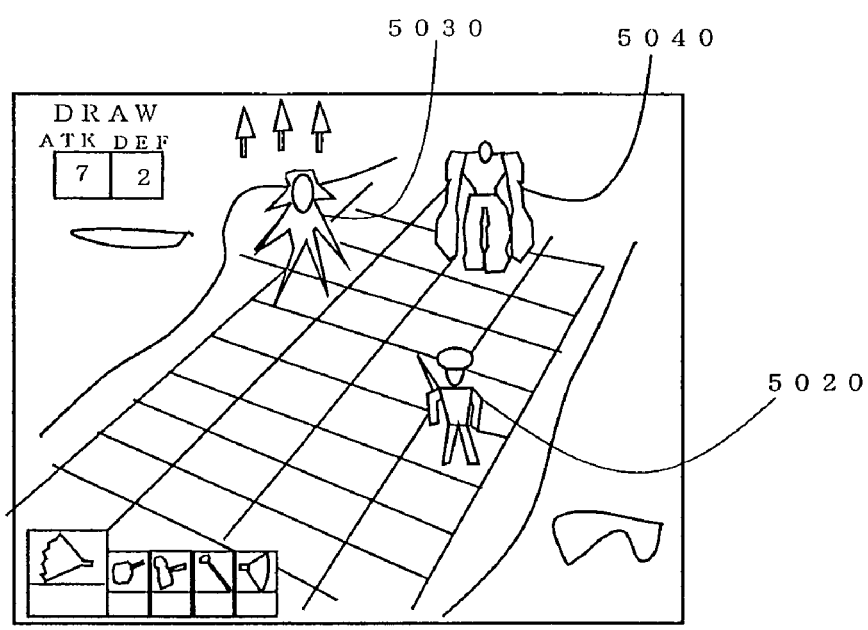
FIG. 14 is a display image showing "draw" of "battle" in FIG. 3.
Figure 15:
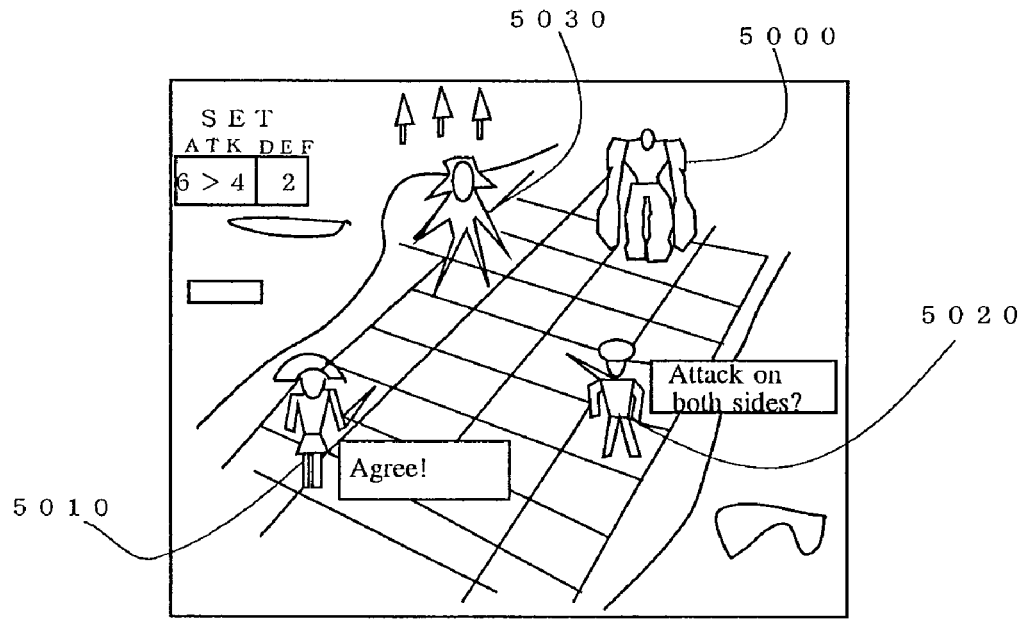
FIG. 15 is a display image showing a communication of users with each other viewed from a user starting the communication in "battle" of FIG. 3.
Figure 16:
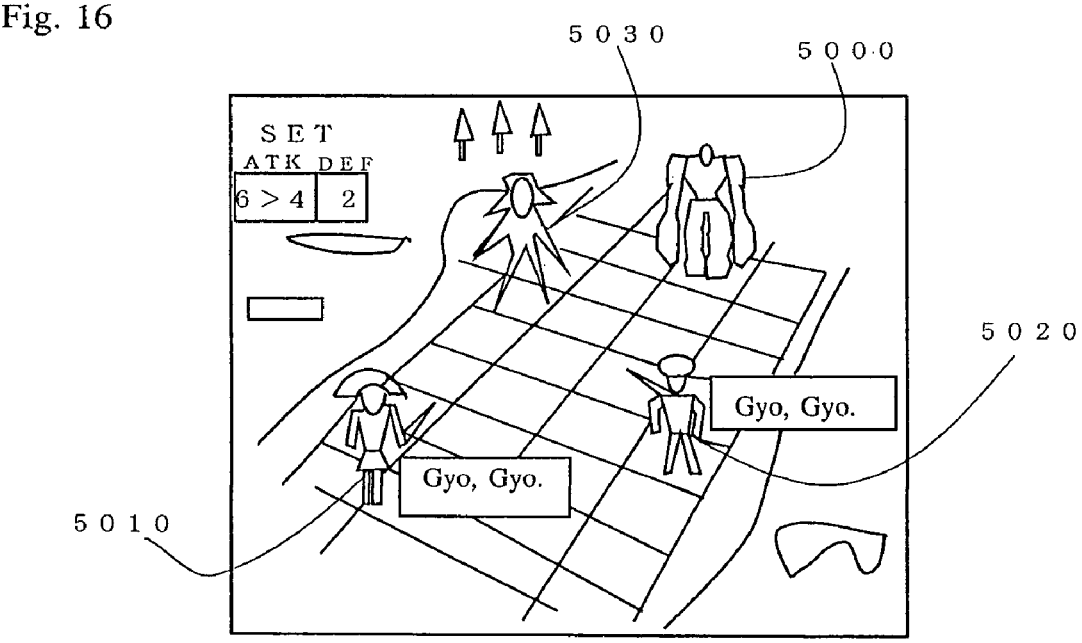
FIG. 16 is a display image showing the communication between users viewed from an opponent user in the "battle" of FIG. 3.
Figure 17:
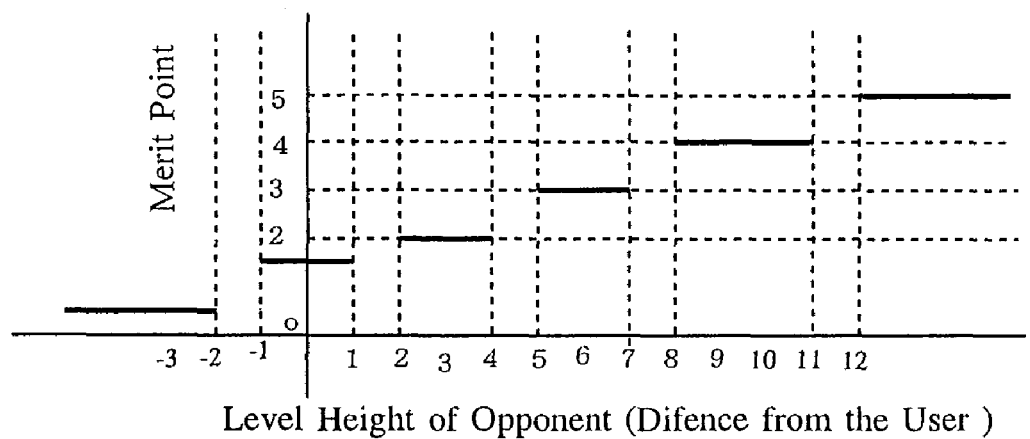
FIG. 17 is a graph showing merit points (marks) at a result processing in FIG. 3.
Figure 18:
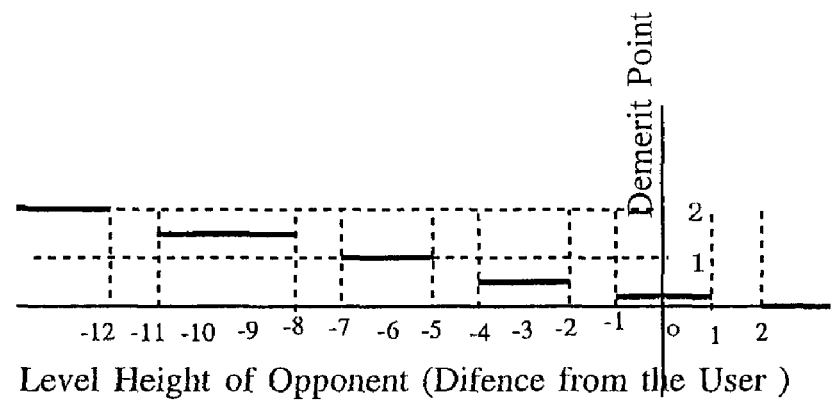
FIG. 18 is a graph showing demerit points (marks) at a result processing in FIG. 3.

FIG. 3 is a flowchart showing a total processing of the game system in FIG. 1, FIG. 4 is a flowchart showing a processing of "game watching" in FIG. 3, FIG. 4-1 is a menu for selecting a processing of the "game watching" in FIG. 3, FIG. 4-2 is a menu for selecting a battle to be watched in the "game watching" in FIG. 3, FIG. 4-3 shows a list of battles to be watched shown in the processing of the "game watching", FIG. 4-4 shows a list of the battles to be watched and detailed data of each battle, FIG. 4-5 shows a menu for registering a battle to be watched in the processing of the "game watching" in FIG. 3, FIG. 5 is a flowchart showing a "grouping processing" in FIG. 3, FIG. 5-1 shows a display image for making a group in the "grouping processing" in FIG. 5, FIG. 5-2 is a display image for participating a group in the "grouping processing" in FIG. 5, FIG. 6 is a flowchart showing an "entry processing" in FIG. 3, FIG. 6-1 shows a menu for selecting "tournament entry" in a battle, "tournament confirmation" or "tournament cancel" in the "entry processing" in FIG. 6, FIG. 6-2 shows a menu for selecting a battle in the "tournament entry" in a battle in FIG. 6, FIG. 6-3 shows details of a tournament in the "entry processing" in FIG. 6, FIG. 6-4 shows a processing of box selection of individual battles in the "entry processing" in FIG. 6, FIG. 6-5 shows a processing of box selection of group battle in the "entry processing" in FIG. 6, FIG. 6-6 shows registering processing in the "entry processing" in FIG. 6, FIG. 6-7 is a graph showing multiplier by which the point of the point index is multiplied in the "entry processing" in FIG. 6, FIG. 7 is a display image showing "deck-edit" of an item card in the "entry processing" in FIG. 6, FIG. 8 is a display image showing the "deck-edit" of a hunter's card in the "entry processing" in FIG. 6, FIG. 9 is a display image showing a rule of the "deck-edit" in the "entry processing" in FIG. 6, FIG. 10 is a display image showing a tournament table of FIG. 6-3, FIG. 11 is a display image showing a communication between users when an online processing is selected in the processing in FIG. 3, FIG. 12 is a display image showing "dice" of "battle" in FIG. 3, FIG. 13 is a display image showing "set" of "battle" in FIG. 3, FIG. 14 is a display image showing "draw" of "battle" in FIG. 3, FIG. 15 is a display image showing a communication of users with each other viewed from a user starting the communication in "battle" of FIG. 3, FIG. 16 is a display image showing the communication between users viewed from an opponent user in the "battle" of FIG. 3, FIG. 17 is a graph showing merit points (marks) at a result processing in FIG. 3, FIG. 18 is a graph showing demerit points (marks) at a result processing in FIG. 3.

In FIG. 1, the game system includes a network 1000, a server 1100 connected to the network and a plurality of game machines 2100, 2110 and 2120. For simple explanation, only three game machines are shown in FIG. 1, however, more users, for example several thousands or several ten thousands users (game machines) may be connected to the network.

The server 1100 controls games, with inputting from and outputting to the game machines 2100, 2110 and 2120, various information. The users of the game machines 2100, 2110 and 2120 operate the game machines with inputting commands by means of controllers (2109, 2119 and 2129) connected to the game machines so that the games controlled by the server 1100 are executed.

There are network games, among the above games, which a plurality of users can join. When the game machines 2100, 2110 and 2120 in FIG. 1 join the same network game, display images necessary for the users playing in a common virtual space are displayed in the displays 2105, 2115 and 2125 of the game machines 2100, 2110 and 2120. For example, characters 2107, 2117 and 2127 corresponding to the users of the game machines 2100, 2110 and 2120 are shown as images, viewed from view points of the users, respectively.

The game machines 2100, 2110 and 2120 are connected with the controllers 2109, 2119 and 2129 and keyboards 2102, 2112 and 2122. The users operate various operations by means of the controllers 2109, 2119 and 2129 for executing the game.

The user can play match against or cooperate with the users participating in a common network game, and can also communicate with the users.

The game machines 2100, 2110 and 2120 have a construction as shown in FIG. 2, for example.

In FIG. 2, the game machine includes a CPU 1000 for controlling totally the game machine, a boot ROM 1010 for storing a program for starting up the game machine and a system memory 1020 for storing data and programs executed by the CPU 1000.

The game machine includes a video display processor 1030 for generating and controlling images to be displayed and a graphic memory 1040 for storing the image generated. The video display processor 1030 displays an image on the displaying portion 1060 such as TV monitor according to the generated image.

The game machine includes an audio processor 1070 for generating a sound and an audio memory 1080 for storing data of the sound generated. The audio processor 1070 generates digital signal of the sound according to the data stored in the audio memory 1080. The digital signal is transformed into an analog signal, amplified into a proper level, and input to the TV monitor etc. for outputting the sound.

The game machine includes a card slots A and B to which a memory card as a memory medium is inserted. A memory interface 1130 is connected to the card slots A and B. Since data of user's status in a game can be stored in the memory card, an interrupted game can be restarted by reading the data in the memory card through the memory interface 1130 into the system memory 1020.

The game machine includes terminals 1, 2, 3 and 4 for connecting the controller (2109, 2119 and 2129), and a controller interface 1140 is connected to the terminals 1, 2, 3 and 4.

Instead of the controller (2109, 2119 and 2129), a microphone (not shown) can be connected to the terminals 1, 2, 3 and 4 and the controller interface 1140 so that a sound data is transformed into a digital signal in the microphone and input to the game machine.

The game machine includes a communication interface 1160 to which a modem 1150 is connected for transmitting to and receiving from other game machines, game programs and data. Therefore, the user can play match against, cooperate with, communicate with or do something with the users in the network game.

The game machine includes a bus arbiter for arbitrating a communication between CPU 1000 and other components with one another. The programs and data are properly read out of and written into the components by the bus arbiter 1170.

The game programs and various data are stored in a CD-ROM (not shown) or other memory media optically readable, and the game machine has a CD-ROM drive 1090 for reading the CD-ROM.

The memory media are not limited to the CD-ROM, magnetically readable and writable media such as floppy disks, optically readable and writable media such as CD-R and DVD-R etc. and other media can be applied. When a boot program is stored in the memory media, the boot ROM 1010 can be omitted.

The TV monitor 1060 may be a CRT, color LCD, plasma display, DLP type projector and any other display means.

As a communication medium for communicating with other game machines may be serial or parallel wire communication media, wireless communication media and various types communication media.

The game machine is not limited to the construction in FIG. 2, and but a general purpose computer, portable computer, a mobile phone or any other information processing terminals may be applied to a game processing terminal.

When a game system includes a general purpose computer as a game machine, a computer-executable program including program codes, by which the user let the computer execute each step of the program for executing the game, is read into the computer.

The program by which the general purpose computer executes the game is read from a ROM incorporated within the computer, from a computer-readable memory medium, or through a network from the server.

An outline of a processing of the game machine in the game system is as shown in FIG. 3.

Step S301: First, the user selects "online" or "offline" on the game machine. The "online" means the network game for executing a game with other game machines connected through the network 1000. The "offline" means a local game for executing a game in the game machine independently from other game machines, without connecting to the network 1000.

Step 302: When "offline" is selected in the step 301, a local game is executed in the game machine. The local game has the same meaning as offline, meaning that a game independently executed without communicating through the network with other game processing terminals.

In the local game, point index (item data) for the local game is used recorded in the memory card or other recording media.

Step S303: When "online" is selected in the step 301, the user selects either "game watching" or "battle" concerning the network game. In the battle of the network game, the game is executed using point index different from the point index of the local game. The point index of the network game is supplied to the players by downloading from the server 1100 to the game machines or in other manners.

At this stage, the user can communicate by "chat" with other users connected to the network, and a display image of FIG. 11 is displayed on the game machine.

In the display image of FIG. 11, characters player characters 4000, 4100 and 4200 representing users, respectively, are shown, which are in a common virtual space "lobby" ("visual lobby" hereafter)" together. An utterance of the character 4000 is shown as chat information in a balloon 4010 adjacent to the character 4000, for example. A name 4020 of the character 4000 may be shown in the balloon 4010. An utterance of the character 4100 is shown in a balloon 4110 adjacent to the character 4100. A name 4120 of the character 4100 may be shown in the balloon 4110.

The utterance in the balloon is character information (text information) input from the keyboard (2102, 2112, 2122). The utterance may be input as a voice from the microphone, and is transferred as voice information to the game machines. Then, the voice is output from the speakers.

Through the communication, opponent players and cooperative players of the group battle are distinguished, and various information exchange and conversation are possible.

During the processing of the steps from S303 to the S306 below, various menus and data are shown in the scene of the visual lobby of FIG. 11 on the game machines.

Step S304: When the "game watching" is selected in the step S303, the user watches the network game after a procedure for the "game watching".

Step S305: When the "battle" is selected in the step S303, the user selects a participation manner of either "individual" or "group (team)".

Step S306: When the "group" is selected in the step S305, the user executes processing of grouping and participating in a group etc.

Step S307: When the "individual" is selected in the step S305, or when the processing of "entry (participation)" is finished in the step S306, a processing for entry of the game is executed. Then, the processing is advanced to step S308.

Step S308: The user participates in the game as an individual or a team, and battles.

When participators of a game are determined by the server 1100, the server deletes information for reservation of participating in the game.

Step S309: When the battle in the step S308 comes to an end, a processing is executed of dividing rewards (point index) and giving demerit marks to the users as users' results.

The point index is also defined for local games, and configurations of the point index of online and offline may be identical to or different from each other.

Since the point of the index for the local game and the network game (online) are independently controlled from each other, one index (online or offline) cannot be used in the game of another type (offline or online).

Step S310: When one of the step S302, S304 or S309 is finished, the user selects to terminate the processing of game machine or not. When not terminated, the processing is returned to the step S301, and when terminated, the total processing is terminated.

FIG. 4 and FIG. 4-1 to FIG. 4-5 show the processing of the steps S303 and S304 (game watching).

In the step S303, a menu M1 of FIG. 4-1 is displayed on the display of the game machine. In the menu M1, menu items "team system organization", "team formation" and "team participation" are shown. When "team system organization" is selected, a menu M2 appears, which includes menu items "team battle" and "team watching". When "team watching" is selected, the processing is advanced to the step S304.

In the step S304, the processing of the following steps from S401.

Step S401: When "team watching" is selected, a menu M3 including menu items "room name", "password", "battle watching" and "registration" is displayed. The user writes a room name and a predetermined password in the "room name" and "password", respectively, then go advance to the step S402. An example of written menu items of "room name" and "password" are shown in FIG. 4-5.

Step S402: When "battle watching" is selected in the menu M3, a list of battle to be watched (menu M4) of FIG. 4-3 is displayed. Three battles are shown in a vertical alignment in FIG. 4-3. Here, one of these battle watching is selected, for example, the topmost "10:05 8 players-individual-A rule-battle 3/8" is selected. The selectable menu items of "battle watching" are the latest battles, only.

In the descriptions of "battle watching", as for the topmost for example, "10:05" means a battle opening time, "8 players-individual-A rule-battle" means a capacity of participators and a kind of rule. "3/8" means three participators and the capacity 8.

When one menu item of the "battle watching" is selected, a list F1 of participators of the selected battle and a tournament table F2 are displayed as shown in FIG. 4-4.

Step S403: As shown in FIG. 4-5, mentioned items in the filled menu M3 are registered when "registration" is push.

FIG. 5, FIG. 5-1 and FIG. 5-2 show the processing of the step S306 (grouping processing).

In the grouping processing, the game machine 2100, 2110 and 2120 transmit information to the server 1100 for reservation of participating in the game, if the users of the game machines want to participate the game.

Step S501: First, the user select "group organization", "participate in group" or "withdraw from group". The "group organization" is a processing for organizing a group, "participate in group" is a processing for participating in a group, and "withdraw from group" is a processing for withdrawing from a group to which the user belongs.

As for the "group organization" and "participate in group", the user can collect information concerning the group members through the communication with other users at the visual lobby in FIG. 11.

Step S502: When the "withdraw from group" is selected in the step S501, the server 1100 judges whether there is a condition or not for the withdrawal from the group to which the user belongs.

Step S503: When it is judged that there is a withdrawal condition in the step S502, the user executes a predetermined procedure for satisfying the condition. The condition is that the user pays a point index, for example. The conditions contribute survival of groups, stimulate users to participate in unattractive groups, and various configuration is possible for providing the maximum pleasure to the maximum users.

Step S504: When it is judged that there is no withdrawal condition in the step S502, or when the condition is satisfied in the step S503, the withdrawal processing is executed.

Step S505: When the "group organization" is selected in the step S501, the server 1100 judges whether the user belongs to other groups or not.

Step S506: When it is judged in the step S505 that the user belongs to other groups, the user withdraws from the groups to which the user belongs. The withdrawal processing is similar to those of steps S502 to S504.

Step S507: When it is judged in the step S505 that the user does not belongs to any groups, or the user has withdrawn the groups in the step S506, a display image of FIG. 5-1 is displayed. The user writes an organized group name and a predetermined password in the image in FIG. 5-1.

Step S508: When "organization" is push in the image, after the writing in the step S507, the "group organization" is finished.

Step S509: When the "participate in group" is selected in the step S501, the server 1100 judges whether the user belongs to other groups or not.

Step S510: When it is judged in the step S509 that the user belongs to other groups, the user withdraws from the groups to which the user belongs. The withdrawal processing is similar to those of steps S502 to S504.

Step S511: When it is judged in the step S509 that the user does not belongs to any groups, or the user has withdrawn the groups in the step S510, a display image of FIG. 5-2 is displayed. The user writes a group name the user wants to belong to and a predetermined password in the image in FIG. 5-2.

Step S512: When the group name is designated which the user wants to belong to in the step S511, the server 1100 judges whether there is a condition for belonging to the group. The condition is that the user pays a point index, for example.

The payment is expensive for attractive groups, for example, so as to contribute a total balance of groups.

Step S513: When it is judged that there is condition in the step S512, the user executes a processing corresponding to the condition.

Step S514: When it is judged that there is no belonging condition in the step S512, or when the processing is executed corresponding to the condition in the step S513, the server 1100 includes the user within the group the user want to belong to.

FIG. 6, FIG. 6-1 and FIG. 6-2 show the processing of the step S307 (entry).

Step S601: The user operates the game machine so that a menu M10 in FIG. 6-1 is displayed for the step S307, and selects "tournament" in the menu M10. Then, a menu M11 is displayed. In the M11, menu items of "tournament entry", "tournament confirmation" and "tournament cancel" are displayed.

During the processing of the steps from S601 to the S608 below, various menus and data are shown in the scene of the visual lobby on the game machines.

The user selects one of the "tournament entry", "tournament confirmation" and "tournament cancel". By the "tournament entry", the user or the user's group enters a tournament. By the "tournament confirmation", details of the tournament the user or the user's group belongs to are shown. By the "tournament cancel", the user or the user's group cancels the tournament the user or the user's group belongs to.

Step S602: When the user or the user's group selects the "tournament cancel" in the step S601, the user or the user's group cancels the tournament.

Step S603: When the user or the user's group selects the "tournament entry" in the step S601, the user or the user's group selects a tournament.

When the "tournament entry" is selected, a menu M12 of FIG. 6-2 is shown. In the menu M12, a tournament opening time, capacity of participators, distinction of individual battle or group battle, rule, the present number of participators are shown for each tournament the user or the user's group can participate, and one of the tournaments can be selected.

When a tournament is selected, three pages data D1, D2 and D3 are shown concerning the selected tournament as shown in FIG. 6-3. The data D1 is a rule, data D2 is a tournament table and data D3 is details of the rule. The data D1 to D3 are changeable by the right page indicator "R" or the left page indicator "L" in the image.

In the "tournament entry", the game machine 2100, 2110 and 2120 transmit information to the server 1100 for reservation of participating in the tournament, if the users of the game machines want to participate the tournament.

The tournament table D2 of FIG. 6-3 is displayed on the display of the game machine, as shown in FIG. 10. The tournament table D2 is shown as a board in a sight of the visual lobby in the game space, where various characters exist together. The present time is shown in the sight for the user to check the time until the tournament opening time. It is better to shown the time controlled by the server as the present time than the time controlled by each game processing terminal.

Step S604: When a tournament is selected, the server 1100 judges whether the user has a point index necessary for the entry in the tournament or not.

The point index is represented by cards 3000, 3010, 3020, 3030, 3040, 3050, 3060 and 3070, for example, as shown in FIG. 7. For each point index, a point is given, and a card, an item or other parameters and using manners are determined.

The point index may include only the parameters of function in the game without including image data for displaying the card or item.

Occasionally, an image data is associated with text data of parameters and using manners. The text data for text display may be included in the image data or in the using manner.

Each tournament has a predetermined point index and necessary points. The server 1100 judges whether the user has necessary point index of more than necessary points or not. When the user has the necessary point index of sufficient points, the user selects point indexes used in the tournament in the image of FIG. 7. An aggregation of the selected point indexes is called "deck", and the selection of point indexes is called "deck edit".

On the "deck edit", the point of each point index is adjusted according to the point indexes of the total users.

When, for example, a summation of the total points of users is not more than a predetermined value ($<=1000$, for example), a multiplier is "1", and the multiplier is decreased as the total summation increases. Therefore, the value of the point is always rationalized so that a tensionless atmosphere due to excessive points is prevented and the battle motivation and the ambition are kept.

When the value of the point index is adjusted, the point indexes for the network game held by the players are substituted by point indexes of value set in the server, which are downloaded from the server to the game machines.

On the other hands, the multiplier may be "1" or more for executing a dynamic game with big points.

The multiplication result of the points multiplied by the multiplier is notified the users on the "deck edit".

When the user holds the necessary point index of necessary points, the server judges that the user has a "deck" and go advance to the step S604. When it is judged that the user does not have a "deck", the processing is terminated without any processing.

Step S604: When it is judged that the user has a "deck" in the step S603, the user selects a tournament position (called "box", hereafter) in the tournament table.

FIG. 6-4 shows menus M13 and M14 for box selection in a individual battle. In the menu M13, selected tournament boxes (shown by A, B, C and D) and participators are shown, that is, a participator AAAA is registered in a box A, a participator BBBB in a box B, a participator CCCC in a box C, and a participator DDDD in a box D. In the menu M14, the participators are shown in the tournament table. In the menus M13 and M14, a right page indicator "R" and left page indicator "L" are shown for switching the menu from one of M13 and M14 to the other.

FIG. 6-5 shows menus M15 and M16 for box selection in a group battle. In the menu M15, selected tournament boxes (shown by A, B, C and D) and participators are shown, that is, a participating group Gaaa is registered in a box A, a participating group Gbbb in a box B, a participating group Gccc in a box C, and a participating group Gddd in a box D. In the menu M16, the participating groups are shown in the tournament table. In the menus M15 and M16, a right page indicator "R" and left page indicator "L" are shown for switching the menu from one of M15 and M16 to the other.

In the group battle, a box can be reserved for another users. As shown in FIG. 6-5, a reserved box is given a lock mark for preventing other users from joining the battle in the reserved box. This operation is called "lock". In the step S606, the server 1100 judges whether the user executes the processing of "lock" or not.

Step S607: When the user executes the processing "lock", the server 1100 locks the designated box.

When the user selects the "lock" processing in the step S606, a menu M17 in FIG. 6-6 for selecting a box is shown. When a box is selected in the menu M17, a password input board M18 is shown. When a password is input in the menu M18 and the "registration" is push, the processing "lock" is completed.

Step S608: When the "lock" processing is not executed in the step 606, or the "lock" is completed in the step S607, the server 1100 judges whether it is the time to open the battle. If before the opening time, the server returns to the step S601. Therefore, if before the opening time, the user can change or cancel the tournament.

The character can be moved to other place than the lobby or can join in other games in the visual space until the battle opening time.

Step S609: When it is the battle opening time, the server let the game machines execute the deck edit (card selection). The display image is compulsorily changed to a game image so that the game is started, when a predetermined time passes or the card selection is finished within the predetermined time.

When the card selection is not finished within the predetermined time, cards are automatically selected by the game processing terminal from the card the user has already held, or a deck is selected from a plurality of decks user has already held.

As mentioned above, since the game is compulsorily started at a predetermined time, the tournament is managed smoothly. The user can select a favorable tournament considering the opening period etc. and user of common taste match against one another in the game.

In the deck edit, a card representing a function of the user or the group is selected in FIG. 8 as a subjective index (character). In FIG. 8, a card named "Sil'fa" and its specification are shown. The subjective indexes are classified into "hero" and "enemy". The card representing a user on the "hero" side is called "hunter's card".

When a "decision" button is pushed in FIG. 8, the card is selected, and when a "cancel" button is pushed, other cards are shown. When a "card details" button is pushed, detail information of the card displayed is shown.

The selected card in FIG. 7 is called "item card" of a subjective index, which fights against the "enemy" as a branch of the player. There are other subjective indexes of "enemy card" and "boss cards". The "boss card" is a branch of the user who selects the enemy side. The "enemy card" is a subjective index positioned in a battlefield as battle potential on the enemy side.

In the image of FIG. 7, when a "organization" button is push after the card selection, the deck edit is finished. When a "return" button is push, the selected card is changed. When a "increase or decrease" button is push, the number of cards to be selected can be increased or decreased.

Further, there are "action card" and "assist card". The "action card" is used when the subjective index performs an action. The "assist card" defines an action and has a function as a point index.

In the deck edit, an image of FIG. 9 is shown concerning the rule, and the rule can be arranged. When a displayed rule is selected, a description concerning the rule is shown and a rule of the battle time etc. can be input for editing the rule.

Step S610: When the user or the user's group selects the "tournament confirmation" in the step S601, the server shows details of the tournament the user or the user's group participating in.

FIG. 12 to FIG. 16 show scenes of the battle of the step S308.

In FIG. 12, the battle is advanced as each user throws a virtual die (called "dice"). The user who has thrown the die can perform an action corresponding to spots on the die. For example, in FIG. 12, the spots on the die of the user on the hero side is "5", and the spots on the die of on the enemy side is "3".

When "dice" is executed, the scene of the game space, the participators' characters and so forth are shown in the image.

In FIG. 13, the participator on the hero side can arm himself by the item cards correspondingly to the result of the "dice" in FIG. 12. The participator on the enemy side can position enemy 5000 etc. on squares in the battlefield. In FIG. 13, 5010 and 5020 are characters on the hero side and 5030 is a character of the boss card.

The operation in FIG. 13 is called "set". Each operation of the "set" can be defined within a number of the maximum spots on the die. The number of spots is consumed correspondingly to the operation of the "set".

Next, the participators on hero and enemy sides can move the characters or enemys by squares of number corresponding to the spots on the die. The number of squares of moving is decreased by the number of the spots consumed at the "set".

The moving operation is called "move".

After the "move", each user executes various actions. Each user designates an action for offense or defense by the action card the user holds.

The user can executes "draw" operation after an action.

In FIG. 14, during the "draw" operation, the user can substitutes cards the user holds of a number with a predetermined number of new cards. By the card substitution, an aleatory element is given to the game. The newly given cards to each user are changed according to the user's result. Theretofore, the better the user's result is, the higher the possibility is that good cards are given to the user. So, the users' will to win is hightened, and the interest of the game is motivated.

The results of the users are ranked, according to the total point and the total number of battles, to a plurality of levels ('card levels', hereafter).

During a battle, each user can communicates with other users by the "chat". The contents of the chat can be transmitted to designated players. The players to whom the contents are transmitted can be designated, for example, by buttons (2109B, 2119B, 2129B) of the controller (2109, 2119, 2129).

When the user represented by the character 5020 talks to the user represented by the character 5010, as shown in FIG. 15, the contents of the talk is shown only on the game machines of these users. In FIG. 15, the character 5020 asks the character 5010, "Attack on both sides?", and the character 5010 answers, "Agree!".

As shown in FIG. 16, the communication between the characters 5010 and 5020 is shown on the game machine of the enemy side character 5030 as a meaningless talk "Gonyo, Gonyo.". The user of the character 5030 feels a pressure because the hero side communicates something, while the hero side has an advantage that their strategy is not leaked to the enemy side. This processing is performed by that a player transmits the communication information as a chat information only to the game processing terminal controlling the characters of the player's side selected by the controller etc. and that the player transmits other generated chat information than the input chat information to the game processing terminal controlling the characters not selected.

The chat information may be either text information input from a keyboard or a controller, or sound information input from a microphone. A chat of text or sound information changed from the original chat information may be transmitted to other game processing terminals not selected. And, only a control data (control signal) may be transmitted to the game processing terminal not selected so that the game processing terminal generates a chat information of "Gonyo, Gonyo." etc.

Further, when the chat information is sound information, the game processing terminals controlling the characters not selected may be controlled so as to reproduce the chat information of lower loudness than that reproduced by the game processing terminals controlling the selected characters.

Therefore, a game of high-degree strategy including psychological strategy can be executed.

The game processing terminal receiving the chat information may be selected not by a players but by a game processing terminal itself, which distinguishes a team on its own side and an opponent, and controls whether the chat information is transmitted as it is or changed, according to the distinction result.

Each game processing terminal distinguishes other game processing terminals whether they are on opponent side or on its own side according to information for matching arrangement, which information is transmitted from other game processing terminals before the game is started. However, teams may be decided and transmitted to the game processing terminals, by the server independently from operation input of players.

FIGS. 17 and 18 are graphs showing merit point and demerit point, respectively, of the result processing in the step S309

In FIG. 17, when a user wins a game against a competitor, the higher a card level of the competitor is than the card level of the user, the more the user obtains merit point. When the card level of the competitor is lower than the user's point by a point more than "2", the user obtains merit point of "0.5". When the card level of the competitor is lower than the user's point by a point not more than "1", the user obtains merit point "1.5". When the card level of the competitor is higher by a point from "2" to "4", the user obtains merit point "2". When the card level of the competitor is higher by a point from "5" to "7", the user obtains merit point "3". When the card level of the competitor is higher by a point from "8" to "11", the user obtains merit point "4". When the card level of the competitor is hgher by a point from "5" to "7", the user obtains merit point "3". When the card level of the competitor is higher by a point not less than "12", the user obtains merit point "5".

In FIG. 18, when a user loses a game against a competitor, the lower a card level of the competitor is than the card level of the user, the more the user is given a demerit point. When the card level of the competitor is higher than the user's point by a point not less than "1", a demerit point of "0" is given to the user. When the card level of the competitor is equivalent to the user's or lower by a point "1" than the user's, a demerit point of "−0.2" is given to the user. When the card level of the competitor is lower by a point from "2" to "4" than the user's, a demerit point of "−0.5" is given to the user. When the card level of the competitor is lower by a point from "5" to "7" than the user's, a demerit point of "1" is given to the user. When the card level of the competitor is lower by a point from "8" to "11" than the user's, a demerit point of "−1.5" is given to the user. When the card level of the competitor is lower by a point not less than "12" than the user's, a demerit point of "−2" is given to the user.

According to the merit and demerit point system, an advantage is clear to match against stronger competitors and various matches will be realized. In order to diversify battles more, it will be possible that every user have obligation to match against users of higher level within a predetermined period.

There are the individual games and the group games. The merit and demerit pints are directly applied to the individual battles. However, since the number of participators of each group is not equivalent to one another, the point for each group is divided to the participators.

For dividing the point, a point of an average with omitted fraction is divided to each participator.

For example, when user A1 and A2 in a group A are of card level "4" and "15", respectively, and user B1 and B2 in a group B are of card levels "6" and "8", respectively. And, the group A wins against the group B.

An average of the card level of the group A is (4+15)/2=9.5, and becomes "9" by the fraction omission. An average of the card level of the group B is (6+8)/2=7, which lower by "2" than that of the group A. Therefore, the group A obtains a merit point "0.5" and the group B is given a demerit point "0". The users A1 and A2 obtains a point "0.2" by the fraction omission of "0.5/2=0.25", respectively. The users B1 and B2 is given a demerit point of (0/2)=0.

Then, inequity of merit and demerit points is prevented among games, and good fight and effort in a battle is rewarded.

Second Embodiment

Next, the second embodiment of a game system according to the present invention is described with reference to the drawings.

Figure 19:
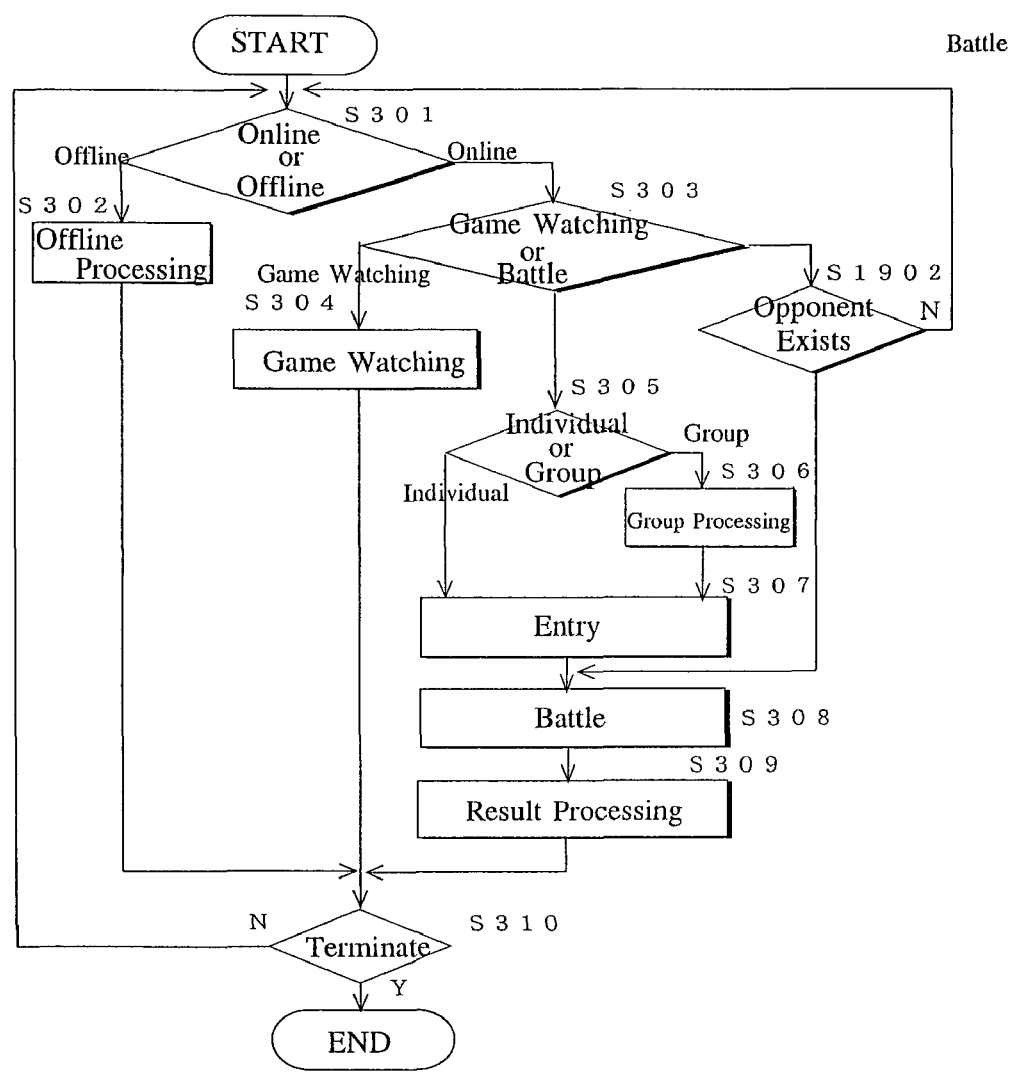
FIG. 19 is a flowchart showing a total processing of the game system of the present invention.
Figure 20:
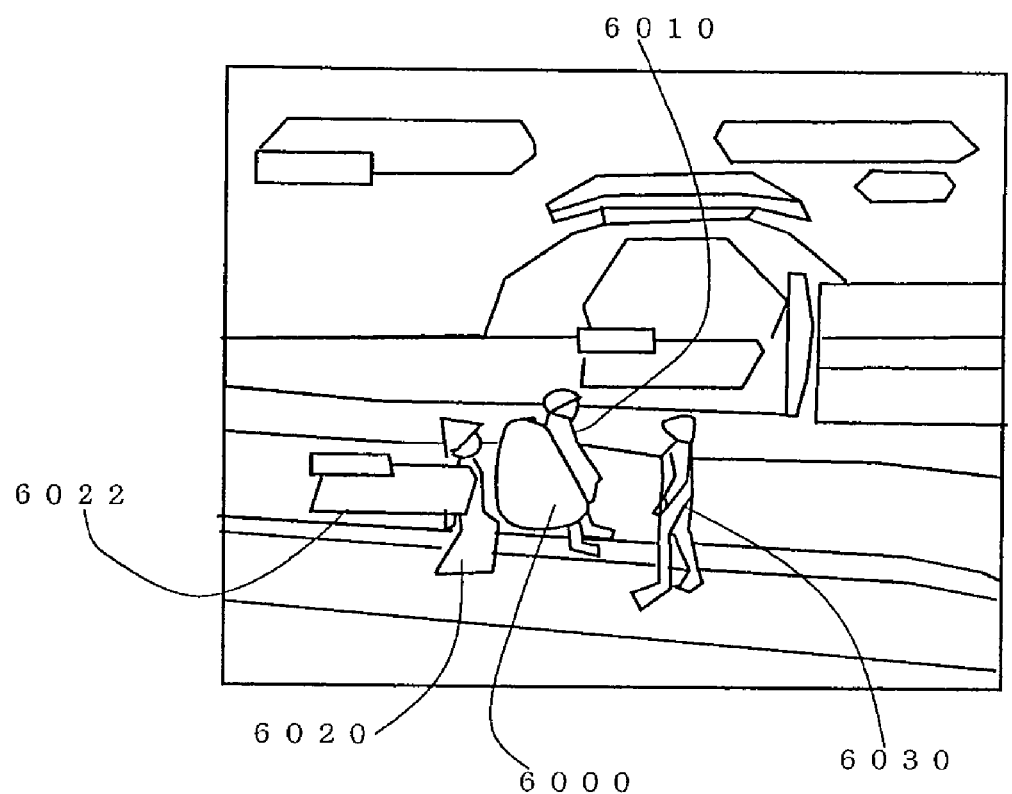
FIG. 20 is an image of a battle corner in the visual lobby for the processing in FIG. 19.

FIG. 19 is a flowchart showing a total processing of the game system of the present invention, FIG. 20 is an image of a battle corner in the visual lobby for the processing in FIG. 19.

In the figures, equivalent or corresponding portions to those in the first embodiment are designated by the same references as those in the first embodiment, and the descriptions for them are omitted.

In FIG. 19, the processing of the step S303 ("game watching" or "battle") in FIG. 3 is processed in the step S1901 ("game watching", "battle" or "battle corner").

The "game watching" and "battle" are similar to those in FIG. 3. When "game watching", the processing of the step S302 is executed, and when "battle", the processing of the steps S305 to S309 are executed.

The "battle corner" is provided for users who feel the procedures of entry etc. complicated. The user can immediately start a battle when an opponent user is found in the battle corner.

As shown in FIG. 20, the battle corner is provided at a predetermined position of the virtual space of the visual lobby. A user 6010 who wants to do battle immediately is in condition to find opponents easily such that the user 6010 is waiting for opponents at seat 6000.

When a user 6020 who wants to do battle immediately finds an opponent user 6010, the user 6020 talks to the user 6010 as shown in a balloon 6022. A battle of users 6010 and 6020 is started when approved by both users 6010 and 6020. The server 1100 makes grouping so that data of the users 6010 and 6020 can transmitted only to the other, and a game with communication can be executed exclusively by the users 6010 and 6020. Each game processing terminal reads data of the game space from a memory medium and displays the data on the display so that the character is moved to a game battlefield of a designated virtual space.

The grouping processing includes not only the processing of transferring the data from each game processing terminals to other game processing terminals through the server, but also the processing of transmission of address of the game processing terminal to the other for a direct mutual communication between the game processing terminals.

When the battle corner is selected in the step S1901 in FIG. 19, it is judged whether the user (6010 etc.) in the battle corner who wants to do battle approves with the user 6020, or not. When the user 6010 etc. approves the processing is advanced to the step S308 so that a battle is started. When not approved, the processing is returned to the step S301.

It is also possible to make the grouping, without approval after talking, by detecting that two or more users move into a predetermined position in the visual lobby.

The second embodiment makes the procedure much simpler for the battle, and game entry is very smooth.

ADVANTAGES

According to the present invention, the game entry proceedings and entry motivation of players to games are improved.

Furthermore, it is enabled that players transmit chat information advantageous to cooperative players playing the same game in order to introduce the cooperative players to advantageous status, and that the players are conscious of enemies (opponents).

What is claimed is:

1. A network game system comprising a network, a plurality of game processing terminals connected to said network and a server which receives information transmitted through said network from said game processing terminals and transmits necessary information to said game processing terminals,
    wherein a visual lobby is provided in a three dimension virtual space, a battle corner is provided at a predetermined position in said visual lobby and said battle corner is a partial area of said visual lobby,
    wherein characters, controlled by game processing terminals, currently positioned in said visual lobby outside said battle corner can recognize characters currently positioned in said battle corner inside said visual lobby, and characters controlled by game processing terminals currently in said battle corner inside said visual lobby can recognize characters currently positioned in said visual lobby outside said battle corner,
    wherein when a first character controlled by a first game processing terminal of said plurality of game processing terminals is currently positioned in said battle corner inside said visual lobby, said first game processing terminal searches for other characters, controlled by other said game processing terminals, currently positioned in said battle corner inside said visual lobby;
    wherein when said first game processing terminal finds other characters currently positioned in said battle corner inside said visual lobby, said first game processing terminal transmits to said server information necessary for grouping with said other game processing terminals controlling said other characters; and
    wherein in response to said server receiving said information, said server processes grouping of said first game processing terminal and said other game processing terminals so that only said first game processing terminal and said other game processing terminals play a specific game on the network.

2. A network game processing method in a network game system comprising a network, a plurality of game processing terminals connected to said network and a server which receives information transmitted through said network from said game processing terminals and transmits necessary information to said game processing terminals,
    the network game processing method comprising:
    providing a three dimensional virtual space by one or more of the plurality of game processing terminals, the three dimensional virtual space having a visual lobby and having a battle corner at a predetermined position in said visual lobby occupying a partial area of said visual lobby, wherein the plurality of game processing terminals are capable, respectively, of displaying at least a portion of the three dimensional virtual space,
    providing characters controlled by game processing terminals to occupy said three dimensional virtual space, wherein characters, controlled by game processing terminals, currently positioned in said visual lobby outside said battle corner can recognize characters currently positioned in said battle corner inside said visual lobby, and characters controlled by game processing terminals currently in said battle corner inside said visual lobby can recognize characters currently positioned in said visual lobby outside said battle corner,
    when a first character controlled by a first game processing terminal of said plurality of game processing terminals is currently positioned in said battle corner, said first game processing terminal searching for other characters, controlled by other said game processing terminals, positioned in said battle corner;
    when said first game processing terminal finds other characters currently positioned in said battle corner, said first game processing terminal transmitting to said server information necessary for grouping with said other game processing terminals controlling said other characters;
    in response to said server receiving said information, said server processing grouping of said first game processing terminal and said other game processing terminals so that only said first game processing terminal and said other game processing terminals play a specific game on the network.

3. A computer program embodied on a computer-readable non-transitory storage medium and configured to implement a network gaming method among a server and a plurality of game processing terminals, connected in a network, when the program is read from the storage medium and executed among said plurality of game processing terminals and said server, comprising:
    providing a three dimensional virtual space by one or more of the plurality of game processing terminals, the three dimensional virtual space having a visual lobby and having a battle corner at a predetermined position in said visual lobby occupying a partial area of said visual lobby, wherein the plurality of game processing terminals are capable, respectively, of displaying at least a portion of the three dimensional virtual space,
    providing characters controlled by game processing terminals to occupy said three dimensional virtual space, wherein characters, controlled by game processing terminals, currently positioned in said visual lobby outside said battle corner can recognize characters currently positioned in said battle corner inside said visual lobby, and characters controlled by game processing terminals currently in said battle corner inside said visual lobby can recognize characters currently positioned in said visual lobby outside said battle corner,
    when a character controlled by a first game processing terminal of said plurality of game processing terminals is currently positioned in said battle corner, said first game processing terminal searching for other characters controlled by other said game processing terminals positioned in said battle corner;

when said first game processing terminal finds other characters currently positioned in said battle corner, said first game processing terminal transmitting information necessary for grouping with said other game processing terminals controlling said other characters to said server;

in response to said server receiving said information, said server processing grouping of said first game processing terminal and said other game processing terminals so that only said first game processing terminal and said other game processing terminals play a specific game on the network.

4. The network game system of claim 1, wherein characters positioned in the battle corner are grouped by the server into a specific game with other characters in the battle corner by a grouping method different than for characters positioned outside the battle corner, wherein for characters positioned outside the battle corner the server mediates player acceptance or denial of entry into the grouping, wherein for characters positioned inside the battle corner the server performs grouping of characters into the specific game without inquiring as to acceptance or denial into the grouping, and wherein said specific game is commenced for the first character and one or more other characters based upon: the search by the first game processing terminal, the transmitting of the grouping information by the first game processing terminal, and the processing of the received information by the server, thereby allowing game players to place their character in predetermined positions within the battle corner to avoid procedures of battle entry requiring the server to mediate a request by one game player and an acceptance by another game player to do battle.

5. The network game processing method of claim 2, wherein characters positioned in the battle corner are grouped by the server into a specific game with other characters in the battle corner by a grouping method different than for characters positioned outside the battle corner, wherein for characters positioned outside the battle corner the server mediates player acceptance or denial of entry into the grouping, wherein for characters positioned inside the battle corner the server performs grouping of characters into the specific game without inquiring as to acceptance or denial into the grouping, and wherein said specific game is commenced for the first character and one or more other characters based upon: the search by the first game processing terminal, the transmitting of the grouping information by the first game processing terminal, and the processing of the received information by the server, thereby allowing game players to place their character in predetermined positions within the battle corner to avoid procedures of battle entry requiring the server to mediate a request by one game player and an acceptance by another game player to do battle.

6. The computer program configured to implement a network gaming method according to claim 3, wherein characters positioned in the battle corner are grouped by the server into a specific game with other characters in the battle corner by a grouping method different than for characters positioned outside the battle corner, wherein for characters positioned outside the battle corner the server mediates player acceptance or denial of entry into the grouping, wherein for characters positioned inside the battle corner the server performs grouping of characters into the specific game without inquiring as to acceptance or denial into the grouping, and wherein said specific game is commenced for the first character and one or more other characters based upon: the search by the first game processing terminal, the transmitting of the grouping information by the first game processing terminal, and the processing of the received information by the server, thereby allowing game players to place their character in predetermined positions within the battle corner to avoid procedures of battle entry requiring the server to mediate a request by one game player and an acceptance by another game player to do battle.

7. The network game processing method of claim 2, further comprising:

while a second character controlled by a second game processing terminal is within the visual lobby inside the battle corner, and the first character is within the visual lobby outside the battle corner, displaying by the first game processing terminal the battle corner including the second character within the battle corner, moving the first character into the battle corner by the first game processing terminal, and upon the first character entering the battle corner, the first game processing terminal automatically performing said searching and transmitting, and the server in response automatically processing said grouping to commence the specific game between the first character and the second character without the server seeking acceptance of entry into the specific game from the second game processing terminal.

8. The network game processing method of claim 7, further comprising:

while a third character controlled by a third game processing terminal is within the battle corner of the visual lobby, and the first character is within the visual lobby outside the battle corner, displaying by the third game processing terminal the first character outside the battle corner, moving the third character out of the battle corner by the third game processing terminal before the first character is moved into the battle corner to avoid being automatically grouped by the server to participate in the specific game with the first character.

* * * * *